US008600200B1

(12) United States Patent
Rakich et al.

(10) Patent No.: US 8,600,200 B1
(45) Date of Patent: Dec. 3, 2013

(54) NANO-OPTOMECHANICAL TRANSDUCER

(75) Inventors: Peter T. Rakich, Albuquerque, NM (US); Ihab F. El-Kady, Albuquerque, NM (US); Roy H. Olsson, Albuquerque, NM (US); Mehmet Fatih Su, Albuquerque, NM (US); Charles Reinke, Albuquerque, NM (US); Ryan Camacho, Albuquerque, NM (US); Zheng Wang, Cambridge, MA (US); Paul Davids, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 261 days.

(21) Appl. No.: 13/076,228

(22) Filed: Mar. 30, 2011

Related U.S. Application Data

(60) Provisional application No. 61/320,119, filed on Apr. 1, 2010.

(51) Int. Cl.
*G02F 1/335* (2006.01)
*G02F 1/01* (2006.01)

(52) U.S. Cl.
USPC ........................................ 385/7; 385/1; 385/4

(58) Field of Classification Search
USPC .......................................................... 385/1, 7
See application file for complete search history.

(56) References Cited

U.S. PATENT DOCUMENTS

| 7,733,198 | B1 | 6/2010 | Olsson et al. | |
| 7,836,566 | B1 | 11/2010 | Olsson et al. | |
| 2005/0259937 | A1* | 11/2005 | Whaley et al. | 385/132 |

OTHER PUBLICATIONS

Li, Mo, "Harnessing optical forces in integrated photonic circuits", Nature, vol. 456. 27, Nov. 2008, p. 480-488.*

Anderson, Betty Lise, Ultra-compact optical true time delay device for wideband phased array radars, Proceedings of SPIE, vol. 7669, (2:010) 76690P-1.

Antonelli, G. Andrew, A study of the vibrational modes of a nanostruciure with picosecond ultrasonics, Physica B 316-317 (2002) 434-437.

Chan, Jasper, Optical and mechanical design of a "zipper" photonic crystal optomechanical cavity, Optics Express, vol. 17, No. 5, Mar. 2, 2009, 3802-3817.

Chiao. R. Y., Stimulated Brillouin Scattering and Coherent Generation of Intense Hypersonic Waves, Physical Review Letters, vol. 12, No. 21, May 25, 1964, 592-596.

Daly, B. C., Picosecond ultrasonic measurements of attenuation of longitudinal acoustic phonons in silison, Physical Review B80, 174112 (2009), 5 pgs.

Eichenfield, Matt, Actuation of micro-optomechanical systems via cavity-enhanced optical dipole forces, Articles, Nature Photonics, vol. 1, Jul. 2007, 416-422.

(Continued)

*Primary Examiner* — Ryan Lepisto
(74) *Attorney, Agent, or Firm* — Kevin W. Bieg

(57) ABSTRACT

A nano-optomechanical transducer provides ultrabroadband coherent optomechanical transduction based on Mach-wave emission that uses enhanced photon-phonon coupling efficiencies by low impedance effective phononic medium, both electrostriction and radiation pressure to boost and tailor optomechanical forces, and highly dispersive electromagnetic modes that amplify both electrostriction and radiation pressure. The optomechanical transducer provides a large operating bandwidth and high efficiency while simultaneously having a small size and minimal power consumption, enabling a host of transformative phonon and signal processing capabilities. These capabilities include optomechanical transduction via pulsed phonon emission and up-conversion, broadband stimulated phonon emission and amplification, picosecond pulsed phonon lasers, broadband phononic modulators, and ultrahigh bandwidth true time delay and signal processing technologies.

23 Claims, 17 Drawing Sheets

(56) References Cited

OTHER PUBLICATIONS

Holzwarth, C. W., Localized Substrate Removal Technique Enabling Strong-Confinement Microphotonics in Bulk Si CMOS Processes, 2008 OSA/CLEO/QELS 2008, CThKK5.pdf, Sandia National Laboratories, downloaded on Aug. 17, 2010 UTC from IEEE Xplore, 2008 IEEE.

Hubert, F, Confined logitudinal acoustic phonon modes in free-standing Si membranes coherently excited by femtosecond laser pulses, Physical Review B 79, 201307 (R) (2009).

Ippen, E. P., Stimulated Brillouin in optical fibers, Applied Physical Letters, vol. 21, No, 11, Dec. 1, 1972, 539-541.

Jalali, B., Prospects for Silicon Mid-IR Raman Lasers, IEEE Journal of Selected Topics in Quantum Electronics, vol. 12, No. 6, Nov./Dec. 2006, 1618-1627.

Li, Mo, Broadband all-photonic transduction of nenocantilevers, Nature Nanotechnology, vol. 4, Jun. 2009. 377-382.

Li, Mo, Harnessing optical forces in integrated photonic circuits, Nature, vol. 458, 27, Nov. 2008, 480-486.

Mizrahi, Amit, Mirror manipulation by attractive and repulsive forces of guided waves, Optics Express, vol. 13, No. 24, Nov. 28, 2005, 9804-9811.

Mizrahi, Amit, Two-slab all-optical spring, Optics Letters, vol. 32, No. 6, Mar. 15, 2007, 692-694.

Mizrahi, Amit, Torque and Longitudinal force exerted by eigenmodes on circular waveguides, Physical Review A, 78, 023802 (2008).

Mizrahi, Amit, Optical Bragg accelerators, Physical Review E 70, 016505 (2004).

Mizrahi, Amit, Electromagnetic forces on the dielectric layers of the planar optical Bragg acceleration structure, Physical Review E 74, 036504 (2006).

Nordquist, C. D., A DC to 10-GHz 6-b RF MEMS Time Delay Circuit, IEEE Microwave and Wireless Components Letters, vol. 16, No. 5, May 2006, 305-307.

Notomi, M., Optomechanical Wavelength and Energy Conversion in High-Q Double-Layer Cavities of Photonic Crystal Slabs, Physical Review Letters, 97, 023903 (2006).

Povinelli, M. L., Slow-light enhancement of radiation pressure in an omnidirectional-reflector waveguide, Applied Physics Letters, vol. 85, No. 9, Aug. 30, 2004, 1466-1468.

Povinelli, M. L., High-Q enhancement of attractive and repulsive optical forces between coupled whispering-gallery-mode resonators, Optics Express, vol. 13, No. 20, Oct. 3, 2005, 8286-8295.

Povinelli, M. L, Evanescent-wave bonding between optical waveguides, Optics Letters, vol. 30, No. 22, Nov. 15, 2005, 3042-3044.

Rakich, P, T., Trapping, corralling and spectral bonding of optical resonances through opticalfly induced potentials, Nature Photonics, vol. 1, Nov. 2007, 658-665.

Rakich, P. T., General Treatment of Optical Forces and potentials in Mechanically Variable Photonic Systems, Optics Express, vol. 17; No. 20, Sep. 28, 2009, 18116-18135.

Rakich, P. T., Tailoring optical forces in waveguides through radiation pressure and electrostrictive forces, Optics Express, vol. 18, No. 14, Jul. 5, 2010, 14439-14453.

Rakich, P. T., Scaling of optical forces in dielectric waveguides: rigorous connection between radiation pressure and dispersion, Optics Letters, vol. 36, No. 2, Jan. 15, 2011, 217-219.

Shelby, R. M., Guided acoustic-wave Brillouin scattering, Physical Review B, vol. 31, No. 8, Apr. 15, 1985, 5244-5252.

Tanabe, T., Trapping and delaying photons for one nanosecond in an ultrasmall high-O photonic-crystal nanocavity, Nature Photonics, vol. 1, Jan. 2007, 49-52.

Taniyama, H. Strong radiation force induced in two-dimensional photonic crystal slab cavities, Physical Review B 78, 165129 (2008).

Weigel, R., Microwave Acoustic Materials, Devices, and Applications, IEEE Transactions on Microwave Theory and Techniques, vol. 50, No. 3, Mar. 2002, 738-749.

Williamson, R. C., RF Photonics. Journal of Lightwave Technology, vol. 26, No. 9, May 1, 2008, 1145-1153.

Xia, F., Ultracompact optical buffers on a silicon chip, Nature Photonics, vol. 1. Jan. 2007, 65-71.

\* cited by examiner

NANO-OPTOMECHANICAL TRANSDUCER

CROSS-REFERENCE TO RELATED APPLICATION

This application claims the benefit of U.S. Provisional Application No. 61/320,119, filed Apr. 1, 2010, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to optoacoustic devices and, in particular, to an nano-optomechanical transducer that uses direct optical-to-phononic signal conversion for use in RF or optical signal processing applications.

BACKGROUND OF THE INVENTION

Numerous radar and communications applications urgently require compact, broadband and efficient true-time delay technologies. In the context of radar applications, large fixed radiofrequency (RF) delays are critical for the operation of RF tags, while large arrays of tunable delays are needed to replace mechanically steerable antennae with electronically steerable antennae. In the optical domain, large optical delays are needed to buffer data during the switching and routing of data.

Radar identification using RF tags uses large fixed delays in order to utilize the same antenna element to perform both receive (Rx) and transmit (Tx) functions. Through RF tag identification, the tag must take in a radar signal, delay or buffer it for a period of at least 100 ns, and encode data onto it before transmitting the pulse. In this case, the delay-line enables Rx and Tx functions to be performed through use of the same antenna by switching the mode of operation at different points in time. The key challenge in the case of tag technologies is to keep the size and power to a minimum if such devices are to remain unnoticed. Ideally, the entire device is about the size of a credit-card.

Currently, large RF delays are implemented through use of surface-acoustic-wave (SAW) delay-lines. While SAW delay technologies are very stable and mature, state-of-the-art SAW delay-lines have relatively low operating frequencies (~1 GHz) and are bandwidth limited to ~500 MHz. In addition, SAW devices typically exhibit very high RF insertion losses (~36 dB). This poses a problem, as the radar signals that tags must process are generally centered between 8-15 GHz. Therefore, in order to make use of the large delays afforded by SAW delay-lines, current tag architectures must down-convert the RF signals that they wish to delay and encode through use of a mixing operation. This results in a 10× increase in the number of components, and generates a significant increase in power consumption (generally adding ~400 mW of power consumption).

In addition to RF delay, compact all optical delay lines are needed for data switching, routing and network synchronization of high speed (10-100 GBs) data networks (e.g., to enable header decoding, frame construction or elastic store functions). Both fixed and variable optical delays of (~100 ns) are required while maintaining low insertion loss at high data rates. The primary challenge faced in generating optical delays of this magnitude is posed by optical waveguide losses. Currently, planar lightwave circuits (PLCs) are used to achieve low losses; however, state-of-the-art insertion losses using this technology are currently ~30 dB. Furthermore, the length of such PLC waveguides tends to be ~20 meters, which places a lower limit on the size of such devices.

However, a single chip-scale technology that offers ultra narrowband filtering, large signal delays ($\mu$s-ms), and the ability to integrate complex processing of RF signals (e.g., correlators, switches etc) over broad bandwidths (GHz) remains elusive, while the need for such technologies in the context of RADAR, LADAR, communications, and transponder applications continues to grow. See R. Williamson and R. Esman, *J. of Lightwave Technology* 26 (9), 1145 (2008). A host of technologies and physical processes have been explored to address these technological challenges, with limited success. In the context of RF-photonics, numerous chip-scale optical slow-light solutions have been proposed through which one seeks to replace spools of fiber used for delay with chip-scale waveguides. See F. Xia et al., *Nature Photonics* 1 (1), 65 (2006); and T. Tanabe et al., *Nature Photonics* 1 (1), 49 (2006). However, fundamental optical losses make retention of signals for times in excess of 1 ns difficult with chip-scale optical waveguides. MEMS switching technologies for switching RF transmission line arrays and steering of free-space mirror arrays have also been explored. See B. Anderson et al., *Proceedings of SPIE* 7669, 76690P (2010); and C. Nordquist et al., *IEEE Microwave and Wireless Components Letters* 16 (5), 305 (2006). These technologies continue to face fundamental reliability and speed limitations. Finally, while the favorable loss characteristics of phononic media make electromechanical MEMS resonators and FBAR resonators attractive for signal delay, severe bandwidth and transduction efficiency limitations of electromechanical transducers make such technologies unsuitable for today's high bandwidth needs. See E. Dieulesaint and D. Royer, *Elastic waves in solids II: Generation, acousto-optic interaction, applications*, Springer (2000); and D. Morgan, *Surface acoustic wave filters: with applications to electronic communications and signal processing*, Academic Press (2007).

In the context of signal processing technologies, phononic signals are unique for their ability to preserve coherence for remarkably long times (milliseconds), transmit and process information over ultra-high bandwidths (10-100 GHz), and carry signals via sub-micron wavelengths—allowing for dramatic size reductions over conventional radio frequency (RF) processing components. Development of new phononic domain signal processing technologies, utilizing these advantages, enables thousands of ultra-high performance devices for delay and filtering to be integrated on centimeter-scale chips. To date, however, no mechanisms for broadband phononic signal amplification and transduction, necessary for the realization of such technologies, has been developed. See R. Weigel et al., *IEEE Transactions on Microwave Theory and Techniques* 50(3), 738 (2002); E. Dieulesaint and D. Royer, *Elastic waves in solids II: Generation, acousto-optic interaction, applications*, Springer (2000); D. Morgan, *Surface acoustic wave filters: with applications to electronic communications and signal processing*, Academic Press (2007); and R. Williamson and R. Esman, *J. of Lightwave Technology* 26(9), 1145 (2008).

Acoustic transduction via optomechanical photon-phonon coupling has caught the attention of many since nanoscale light confinement produced remarkably large forces within miniscule volumes, and it is known to produce high frequency phonon transduction. See E. Ippen and R. Stolen, *Applied Physics Letters* 21(11), 539 (1972); R. Chiao et al., *Physical Review Letters* 12(21), 592 (1964); R. Shelby et al., *Physical Review B* 31(8), 5244 (1985); G. Agrawal, *Nonlinear fiber optics*, Academic, San Diego, Calif., (1995); M. Eichenfield et al., *Nature* 459, 550 (2009) and M. Eichenfield et al., *Nature Photonics* 1(7), 416 (2007). To date, however, only narrow-band transduction (~10 MHz) has been demonstrated at modest powers by optomechanical cavity systems and resonant stimulated Brillouin scattering (SBS). Simultaneous optical and mechanical resonances of such systems result in large optomechanical coupling, albeit at an inherent cost in bandwidth. While GHz-data-rate signal processing may, in principle, be accommodated by thousands of resonant optomechanical cavities at equally-spaced frequencies, fundamental challenges—surrounding sophisticated encoding and decoding schemes, large device area, and stringent fabrication tolerance—must be addressed. Furthermore, while SBS might be proposed as an alternate solution, limited photon-phonon coupling in conventional materials render such processes impossible in chip-scale silicon photonics technologies. See B. Jalali et al., *IEEE Journal of Selected Topics in Quantum Electronics* 12 (6), 1618 (2007).

Therefore, a need remains for a chip-scale technology that can meet the current delay-line challenges for use in RF or optical signal processing applications.

SUMMARY OF THE INVENTION

The present invention is directed to a nano-optomechanical transducer, comprising a suspended membrane; a transducing optical waveguide, mechanically coupled to the suspended membrane; and an input optical signal that is coupled into the transducing optical waveguide, wherein the input optical signal generates an acoustic wave that propagates in the suspended membrane. The transducer can further comprise at least one receiving optical waveguide, mechanically coupled to the suspended membrane and separated from the transducing optical waveguide by an acoustic delay length, wherein the input optical signal is an optically encoded signal and wherein the acoustic wave modulates a continuous wave optical signal propagating in the receiving optical waveguide. Preferably, the receiving optical waveguide is substantially parallel to the transducing optical waveguide. The transducing and receiving optical waveguides can be fabricated on a side of the suspended membrane or embedded in the suspended membrane. The waveguides can comprise a rectangular waveguide, or an evanescently-coupled compound, or dual, waveguide, a circular waveguide, or a waveguide having a step-index cross-section that possesses a guided eigenmode. For example, the waveguides can comprise silicon, silicon nitride, germanium, chalcogenide glass, silica, $As_2S_3$ glass, gallium arsenide, or a III-V semiconductor compound. The suspended membrane comprises a semiconductor, glass, or polymer. For example, the suspended membrane can comprise silicon dioxide, silicon nitride, silicon carbide, alumina, or aluminum oxide. Preferably, the suspended membrane comprises a low mechanical impedance (low-Z) effective medium, such as a phononic crystal.

The nano-optomechanical transducer of the present invention provides a new mechanism for ultrabroadband coherent optomechanical transduction based on Mach-wave emission that uses-enhanced photon-phonon coupling efficiencies by low impedance effective phononic medium, both electrostriction and radiation pressure to boost and tailor optomechanical forces, and highly dispersive electromagnetic modes that amplify both electrostriction and radiation pressure.

For high-speed RF and optical signal processing in RADAR, LADAR and communications systems, the ability to efficiently convert GHz-bandwidth signals between the optical and acoustic domains according to the present invention is revolutionary for signal buffering and filtering. For such applications, the optomechanical transducer provides a large operating bandwidth and high efficiency while simultaneously having a small size and minimal power consumption. These qualities are generally extremely difficult to achieve simultaneously due to the limited photon-phonon coupling afforded by radiation pressure at feasible optical energy densities. However, the nano-optomechanical transducer of the present invention can provide enhanced photon-phonon coupling, enabling a host of transformative phonon and signal processing capabilities. These capabilities include: (1) optomechanical transduction via pulsed phonon emission and up-conversion, (2) broadband stimulated phonon emission and amplification, (3) picosecond pulsed phonon lasers, (4) broadband phononic modulators, and (5) ultrahigh bandwidth true time delay (TTD) and signal processing technologies. Within this device framework, all of these functionalities can be achieved via phonon transduction, amplification, and modulation, spanning bandwidths of 2 GHz at 20 mW of optical power within a 100 $\mu m^2$ footprint. Increased bandwidths of 15 GHz are possible with a modest size and power increase.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIGS. 1(*b*)-(*d*) are plots of the computed $E_x$, $E_y$, and $E_z$ field distributions of the TE-waveguide mode for light with a wavelength of λ=1550 nm. FIGS. 1(*e*) and (*f*) show the time-averaged $T_{xx}$ and $T_{yy}$ stress distributions. FIGS. 1(*g*) and (*h*) show the time-averaged $F_x$ and $F_y$ force densities. FIGS. 1(*i*) and (*j*) are schematic illustrations showing the dominant forces seen in the plots of $F_x^{rp}$ and $F_y^{rp}$.

FIGS. 2(*c*) and (*d*) show the time averaged $F_x^{es}$ and $F_y^{es}$ force densities. FIGS. 2(*e*) and (*f*) are schematics illustrating the dominant forces found in the plots of $F_x^{es}$ and $F_y^{es}$.

FIG. 3(*b*) shows the same waveguide after laterally strained by an amount δa to a new dimension of a'=a+δa. The waveguide height (b) and length (L) are held fixed.

FIG. 4(*b*) is a plot of the linear optical force density produced by the same mode on the vertical boundary of a rectangular waveguide, as waveguide dimension is varied in an identical manner.

FIGS. 5(a), (b), and (c) are intensity maps showing the radiation pressure component of force density ($f_x^{rp}$), the electrostrictive component ($f_x^{es}$), and total optical force density ($f_x^{ropt}$) respectively, acting in the lateral waveguide boundary, for waveguides width, a, and height, b, ranging between 100 nm and 500 nm. FIGS. 5(d), (e), and (f) are intensity maps showing the radiation pressure component of force density ($f_y^{rp}$), the electrostrictive component ($f_y^{es}$), and total optical force density ($f_y^{ropt}$) respectively, acting on the vertical waveguide boundary over an identical range of dimensions.

FIGS. 8(d)-(f) show the orientation of radiation pressure on waveguides.

DETAILED DESCRIPTION OF THE INVENTION

Figure 1:
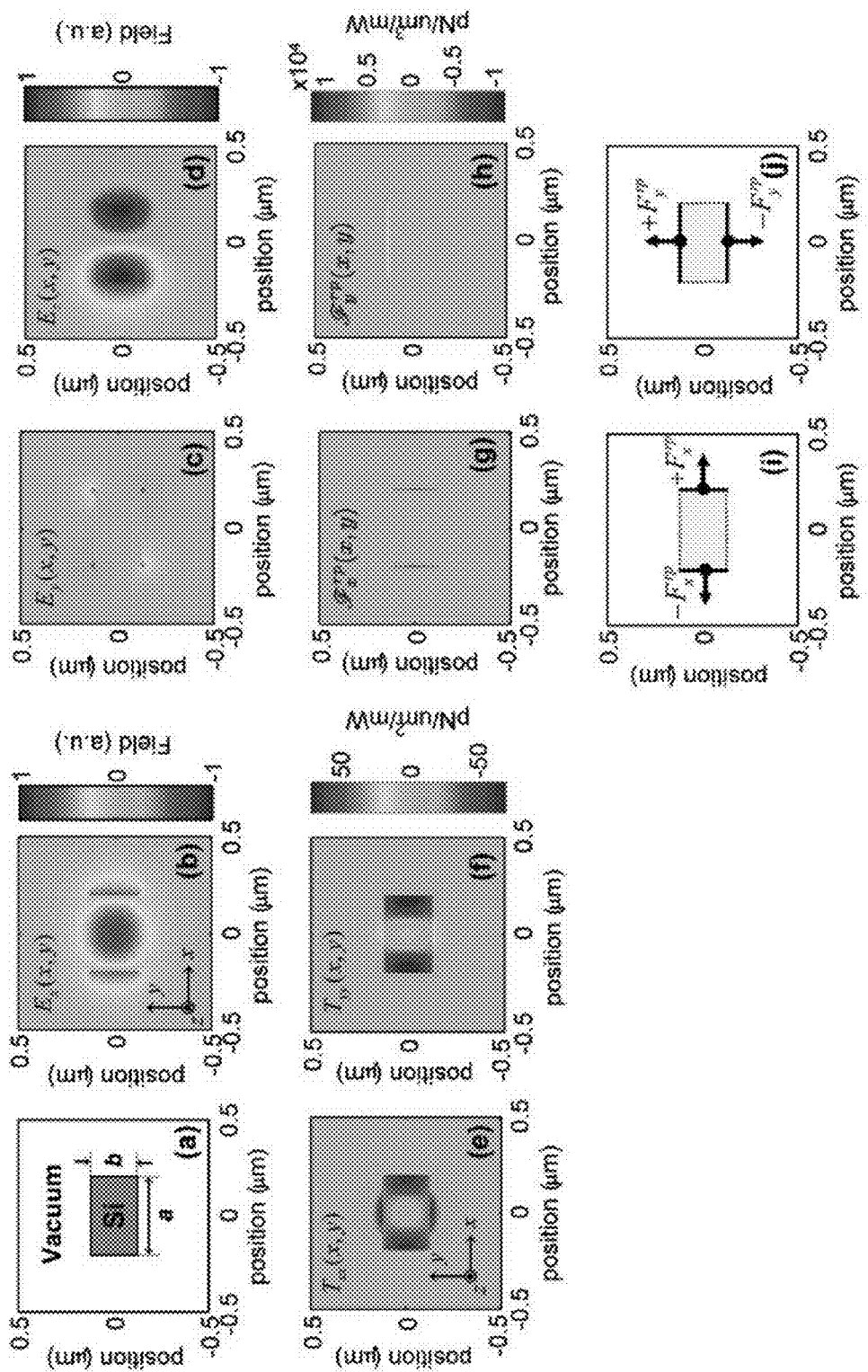
FIG. 1(*a*) is a schematic illustration showing dimensions of a silicon waveguide.

Optical forces can be used as a means of transducing and receiving broadband acoustic signals. Broadband transduction using optical radiation pressure relies heavily on the magnitude of the force that optimized photonic waveguides structures can exert on dielectric boundaries of a guided-wave system. In systems consisting of elastic materials (whose dielectric constant is a function of material deformation), electrostrictive forces can also play an important role. Furthermore, since electrostrictive forces can add constructively or destructively to those of radiation pressure, the aggregate optical force exerted on waveguide boundaries can increase or vanish in some instances. Therefore, forces resulting from both radiation pressure and electrostriction can be considered to enable efficient optomechanical transduction in the context of dielectric waveguide photonics. As an example, below is described the optomechanical coupling of a silicon rectangular waveguide. Pressures of on order $10^4$ N/m² can be generated with such readily fabricatable silicon photonic waveguide structures. Furthermore, given the modest waveguide losses obtainable with the lithographic roughness that is typical at these dimensions, large optical interaction lengths, and therefore large total forces of transduction, are feasible with such structures.

Optical Forces in Dielectric Waveguides

Recent studies of radiation pressure and gradient forces have revealed that large forces can be generated in waveguides and cavities as a consequence of the high confinement and large field enhancements generated within such systems. In many cases, such optical forces can significantly impact the mechanics of bodies at micro- and nano-scales, yielding useful mechanical transduction and actuation at micro- and milli-watt power levels. See P. T. Rakich et al.," *Nature Photonics* 1, 658 (2007); P. T. Rakich et al., *Optics Express* 17, 18116 (2009); M. Li et al., *Nature* 456, 480 (2008); M. Li et al., *Nature Nanotechnology* 4, 377 (2009); M. Eichenfield et al., *Nature Photonics* 1, 416 (2007); J. Chan et al., *Optics Express* 17, 3802 (2009); M. Eichenfield et al., *Nature* 459, 550 (2009); M. Povinelli et al., *Optics Letters* 30, 3042 (2005); M. Povinelli et al., *Optics Express* 13, 8286 (2005); M. Povinelli et al., *Applied Physics Letters* 85, 1466 (2004); A. Mizrahi et al., *Physical Review A* 78, 023802 (2008); A. Mizrahi and L. Schachter, *Optics Letters* 32, 692 (2007); A. Mizrahi and L. Schachter, *Physical Review E* 74, 036504 (2006); A. Mizrahi and L. Schachter, *Optics Express* 13, 9804 (2005); A. Mizrahi and L. Schachter, *Physical Review E* 70, 016505 (2004); M. Notomi et al., *Physical Review Letters* 97, 051803 (2006); and H. Taniyama et al., *Physical Review B* 78, 165129 (2008). In the context of high-confinement silicon photonics, the technological possibilities of such systems have been explored through numerous theoretical and experimental studies of optical forces, focusing on gradient forces and optical forces generated by compound modes of coupled silicon waveguides.

For the purposes of broadband optomechanical transduction, exploitation of the radiation pressure generated on the boundaries of dielectric waveguides provides a simple and possibly more effective technological path to useful phononic transduction with light. Further, optical forces generated in conventional rectangular dielectric optical waveguides by both radiation pressure and electrostrictive forces reveal that electrostrictive forces can make a significant contribution to the optical forces generated in waveguide systems consisting of elastic materials. For example, electrostrictive forces, originating from the strain-dependence of the electric susceptibility, can scale to values comparable with radiation pressure in waveguides consisting of high refractive-index media, such as silicon. Through a parametric study of rectangular single-mode silicon waveguides of all aspect ratios, the optimal waveguide dimensions can be determined to maximize total optically induced forces on the boundaries of a waveguide system for the purpose of optomechanical transduction.

Radiation Forces within Suspended Rectangular Silicon Waveguides

In conventional rectangular waveguide geometries, the most dominant optical forces generated by the fundamental mode of a dielectric waveguide occur at the discontinuous dielectric boundaries of the waveguide system. In the absence of electrostrictive effects, these optical forces can be primarily attributed to radiation pressure. To illustrate this aspect of the forces within the step-index waveguide system, example force distributions generated by the TE-like mode within a suspended rectangular silicon waveguide without a substrate are shown in FIG. 1. In this suspended waveguide, the optical forces are entirely determined by the core material and its geometry. FIGS. 1(a)-(d) show the waveguide cross-section and computed $E_x$, $E_y$, and $E_z$ field distributions corresponding to a silicon waveguide of width, a=400 nm, height, b=250 nm, and optical wavelength, $\lambda$=1550 nm. From these mode field distributions, the optically induced force and stress distribution within the dielectric waveguide can be computed using the proper form of the Maxwell stress tensor in dielectric media, which has been shown to be $$T_{ij} = \varepsilon_0 \varepsilon(x,y)\left[E_i E_j - \frac{1}{2}\delta_{ij}|E|^2\right] + \mu_0\mu\left[H_i H_j - \frac{1}{2}\delta_{ij}|H|^2\right]. \tag{1}$$

Here, $E_k$ ($H_k$) is the $k^{th}$ electric (magnetic) field component, $\varepsilon_0$ ($\mu_0$) is the electric permittivity (magnetic permeability) of free space, and $\varepsilon(x,y)$ ($\mu$) is the relative electric permittivity (magnetic permeability). The body force (force per unit volume acting on the body) generated from radiation pressure and gradient forces are computed from $T_{ij}$ as $F_i^{rp} = \partial_i T_{ij}$. See W. Panofsky and M. Phillips, *Classical Electricity and Magnetism*, Addison-Wesley, MA (1962); and J. Jackson, *Classical Electrodynamics*, Wiley (1975). Since mechanical systems cannot respond to forces at time scales corresponding to an optical cycle, one generally seeks the time averaged Maxwell stress tensor (MST), and body force, which can be defined with $\langle \ldots \rangle$.

The computed spatial distributions of $\langle T_{xx}\rangle$ and $\langle T_{yy}\rangle$ are shown in FIGS. 1(e) and 1(f). FIGS. 1(g) and (h) show the computed intensity maps of $F_x^{rp}$ and $F_y^{rp}$ components of the power normalized body force (force per unit volume) respectively, revealing that the dominant optical forces within the system (i.e., radiation pressure) act on the boundaries of the waveguide system. For clarity, the sign and orientation of the dominant forces are diagrammatically illustrated in FIGS. 1(i) and (j). Note, while MST computations of the type seen in FIG. 1 are very useful, and widely applied, they do not take into account the optical forces generated through electrostriction.

Electrostrictive Forces within Rectangular Silicon Waveguides

With the knowledge of the electrical field distribution and the radiation pressure, the electrostrictive force exerted by the optical field can be calculated. In the context of nonlinear optics, electrostrictively induced refractive index changes are responsible for large third order nonlinearities (or Kerr nonlinearities), giving rise to self focusing and stimulated Brillouin scattering. See R. Boyd, *Nonlinear Optics*, 3rd Ed., Academic Press (2009); Y. Shen, *The Principles of Nonlinear Optics*, Wiley-Interscience (1984); and A. Feldman, *Phys. Rev. B* 11, 5112 (1975). Similar to forces generated by radiation pressure, electrostrictive forces are proportional to optical power, scaling in an identical manner as the optical power is increased. Electrostriction, and the associated electrostrictive forces, produce material contraction (or expansion) which is quadratic with electromagnetic field, and results primarily from the strain dependence of the dielectric constant. See J. Stratton, *Electromagnetic theory*, McGraw-Hill (1941); and A. Feldman, *Phys. Rev. B* 11, 5112 (1975). Electrostriction, not to be confused with piezoelectricity, occurs independent of material symmetry, and increases with the fourth power of material refractive index (making its effects larger for high refractive index materials such as silicon).

For the discussion of optical forces, the following definitions are used: $\sigma_{kl}$ is the local material stress; $S_{kl}$ is the material strain; $v_k$ is the material displacement in the $k^{th}$ coordinate direction; $C_{klmn}$ is the elastic compliance tensor; $E_k$ and $D_k$ are the $k^{th}$ electric and displacement field components respectively; $\varepsilon_{kl}$ is the material dielectric tensor; and $p_{ijkl}$ is the photoelastic (or elasto-optic) tensor. The phenomenological relations between these quantities are $$D_i = \varepsilon_0 \varepsilon_{ij} E_j \tag{2}$$

$$S_{ij} = \frac{1}{2}(\partial_j v_i + \partial_i v_j) \tag{3}$$

$$S_{kl} = C_{klmn}[\sigma_{mn}^{rp} + \sigma_{mn}^{es} + \sigma_{mn}^{mech}] \tag{4}$$

$$\varepsilon_{ij}^{-1}(S_{kl}) = \varepsilon_{ij}^{-1} + \Delta(\varepsilon_{ij}^{-1}) = \varepsilon_{ij}^{-1} + p_{ijkl}S_{kl}. \tag{5}$$

Above, $\Delta(\varepsilon_{ij}^{-1})$ is defined as the strain-induced change in the inverse dielectric tensor, $\sigma_{mn}^{es}$, $\sigma_{mn}^{rp}$, and $\sigma_{mn}^{mech}$ represent the electrostrictive, radiation pressure, and mechanically induced stresses of the system respectively. Thus, in the limit of vanishing optical fields, the optically induced stress components vanish, reducing Eq. (4) to $S_{kl} = C_{klmn}\sigma_{mn}^{mech}$, the familiar relationship between stress and strain in elastic materials. The canonical relation which defines the electrostrictive tensor is $$\langle S_{kl}^{es}\rangle = \frac{1}{2}\gamma_{ijkl}\langle E_i E_j\rangle. \tag{6}$$

Here, $E_i E_j$ are the amplitudes of the rapidly oscillating optical fields. Since materials generally cannot respond mechanically at time scales of the carrier frequency, electrostriction can be expressed in terms of the time-averaged quantities. Above, $\langle E_i E_j \rangle$ is the time-averaged field product, which is related to the induced time-averaged electrostrictive strain, $\langle S_{kl}^{es} \rangle$ through the electrostrictive tensor, $\gamma_{ijkl}$. Following the energetics analyses of Feldman, one can show that the electrostrictive tensor is expressible in terms of the material photoelastic coefficients, in the limit when Kerr effects can be neglected (a reasonable approximation here). See A. Feldman, *Phys. Rev. B* 11, 5112 (1975).

The analysis seeks to understand the forces corresponding to electrostrictive effects. Therefore it is useful to instead relate the optical fields to the electrostrictively induced stress as $$\langle \sigma_{ij}^{es} \rangle = -\frac{1}{2} \varepsilon_0 [\varepsilon_{ij} \rho_{jkmn} \varepsilon_{kl}] \langle E_l E_i \rangle \tag{7}$$

For simplicity of notation, $\langle \ldots \rangle$ will no longer be used to denote time-averaged quantities. From this point forth, it is assumed that all stresses ($\sigma_{ij}$), force related quantities, and field products ($E_i E_j$), are averaged over an optical cycle. Note, while forces due to boundary effects (such as radiation pressure and gradient forces) are often included in the formulation of the electrostrictive stress, they need not be included in this formulation, as they are accounted for through evaluation of the Maxwell stress tensor. Just as with the Maxwell stress tensor, the electrostrictively induced body force acting on the waveguide can be found from the divergence of the stress distribution. However, it is important to note that the body stress defined through elastic theory, $\sigma_{ij}$, adopts a different sign convention in defining the stress tensor than is typical with the Maxwell stress tensor, $T_{ij}$. In elastic theory, the body force (or force density per unit volume exerted on the body) is given by $F_j = -\partial_i \sigma_{ij}$. See E. Dieulesaint and D. Royer, *Elastic waves in solids I: Free and guided wave propagation*, Springer (2000). Therefore, consistency between the two formalisms is maintained if $\sigma_{ij}^{rp}$ is defined as $\sigma_{ij}^{rp} = -T_{ij}$. Thus, the total electromagnetically induced stress on the waveguide is given by $\sigma_{ij}^{opt} = \sigma_{ij}^{rp} + \sigma_{ij}^{es} = -T_{ij} + \sigma_{ij}^{es}$, and the total body force is given by $F_j^{opt} = -\partial_i \sigma_{ij}^{opt} = \partial_i T_{ij} - \partial_i \sigma_{ij}^{es}$.

For isotropic materials (e.g., amorphous glasses) and for cubic crystals (e.g., silicon, germanium), the dielectric tensor, $\in_{ij}$, reduces to $\in_{ij} = \in \cdot \delta_{ij} = n^2 \cdot \delta_{ij}$. In this case, Eq. (7) becomes $$\sigma_{ki}^{es} = -\frac{1}{2} \varepsilon_0 \cdot n^4 \cdot p_{ijkl} \cdot E_i E_j. \tag{8}$$

To examine the effects of electrostriction in a silicon waveguide, and to compare electrostrictive effects with those of radiation pressure, the $\sigma_{xx}^{es}$ and $\sigma_{yy}^{es}$ tensor components can be considered where the x-direction coincides with the [100] crystal symmetry direction. Evaluation of Eq. (8) using the photoelastic tensor of silicon (having cubic crystal symmetry, corresponding to the $O_h$ point group) yields $$\sigma_{xx}^{es} = -\frac{1}{2} \varepsilon_0 \cdot n^4 [p_{11} |E_x|^2 + p_{12} (|E_y|^2 + |E_z|^2)], \tag{9}$$

$$\sigma_{yy}^{es} = -\frac{1}{2} \varepsilon_0 \cdot n^4 [p_{11} |E_y|^2 + p_{12} (|E_x|^2 + |E_z|^2)]. \tag{10}$$

Here, $p_{11}$ and $p_{12}$ are the material photoelastic coefficients, expressed in contracted notation where $11 \to 1$, $22 \to 2$, $33 \to 3$, $23,32 \to 4$, $13,31 \to 5$, and $12,21 \to 6$. The photoelastic coefficients of silicon have been measured to be $p_{11} = -0.09$ and $p_{12} = +0.017$ at 3.39 µm wavelengths. Since the photoelastic coefficients change very little from 3.39-1.5 µms, these values provide a reasonable approximation of the photoelastic properties of silicon in the vicinity of 1.5 µm wavelengths. For more details on photoelastic properties of silicon, see D. Biegelsen, *Phys. Rev. Lett.* 32, 1196 (1974); L. Hounsome et al., *Phys. Stat. Solidi C* 203, 3088 (2006); Z. Levine et al., *Phys. Rev. B* 45, 4131 (1992); and E. Dieulesaint and D. Royer, *Elastic waves in solids II: Generation, acousto-optic interaction, applications*, Springer (2000). Using Eq. (9) and (10), the electrostrictively induced stress distribution in the silicon waveguide under consideration can be computed from the field distributions in FIG. 1. FIGS. 2(a) and 2(b) show the spatial distribution of the electrostrictively generated stress, while FIGS. 2(c) and 2(d) show electrostrictively induced force densities $F_x^{es} = -\partial_j \sigma_{jx}^{es}$ and $F_y^{es} = -\partial_j \sigma_{jy}^{es}$. For clarity, the dominant electrostrictive forces are diagrammatically illustrated in FIGS. 2(e) and 2(f).

Note that the electrostrictive stress distribution is not uniform, but is instead more localized within the center of the waveguide, as it more closely follows the energy density of the optical mode. It is also noteworthy that $\sigma_{xx}^{es}$ is positive while $\sigma_{yy}^{es}$ is negative for all values in space. These stress densities correspond to electrostrictive force-densities (or body-forces) seen in FIGS. 2(c) and 2(d). The force densities reveal that optical forces localized near the waveguide boundaries act to push the vertical boundaries apart while simultaneously acting to pull the horizontal boundaries inward. In FIGS. 2(e) and 2(f) the dominant forces resulting from electrostriction are illustrated. This sign difference between the x- and y-directed body forces can be understood by observing that the $E_x$ field component of the TE-like mode is dominant in Eqs. (9) and (10), and $p_{11}$ and $p_{12}$ are of opposite sign. Therefore, the term containing $p_{11} |E_x|^2$ dictates that $\sigma_{xx}^{es}$ is positive, while the term $p_{12} |E_x|^2$ dictates that $\sigma_{yy}^{es}$ is predominantly negative.

Comparison of Radiation Pressure and Electrostrictive Forces

The origin, spatial distribution, and scaling of electrostrictive forces was examined in the previous section through analytical and computational means. With the understanding that, electrostrictive forces are determined by the material photoelastic tensor, it becomes clear that the sign of the electrostrictive force is highly material-dependent resulting in electrostrictive and radiation pressure-induced forces can be of opposing sign (The material dependence of electrostrictive forces is discussed below). Next, the magnitude of electrostrictive forces in comparison to radiation pressure is examined, revealing that in some instances cancellation of electrostrictive and radiation pressure-induced forces can occur. Through analysis of waveguides of various dimensions, it can be shown that even in simple rectangular waveguides, the optical forces resulting from both radiation pressure and electrostriction can scale to remarkably high levels (i.e., greater than $10^4 (N/m^2)$) for realistic guided powers.

Figure 2:
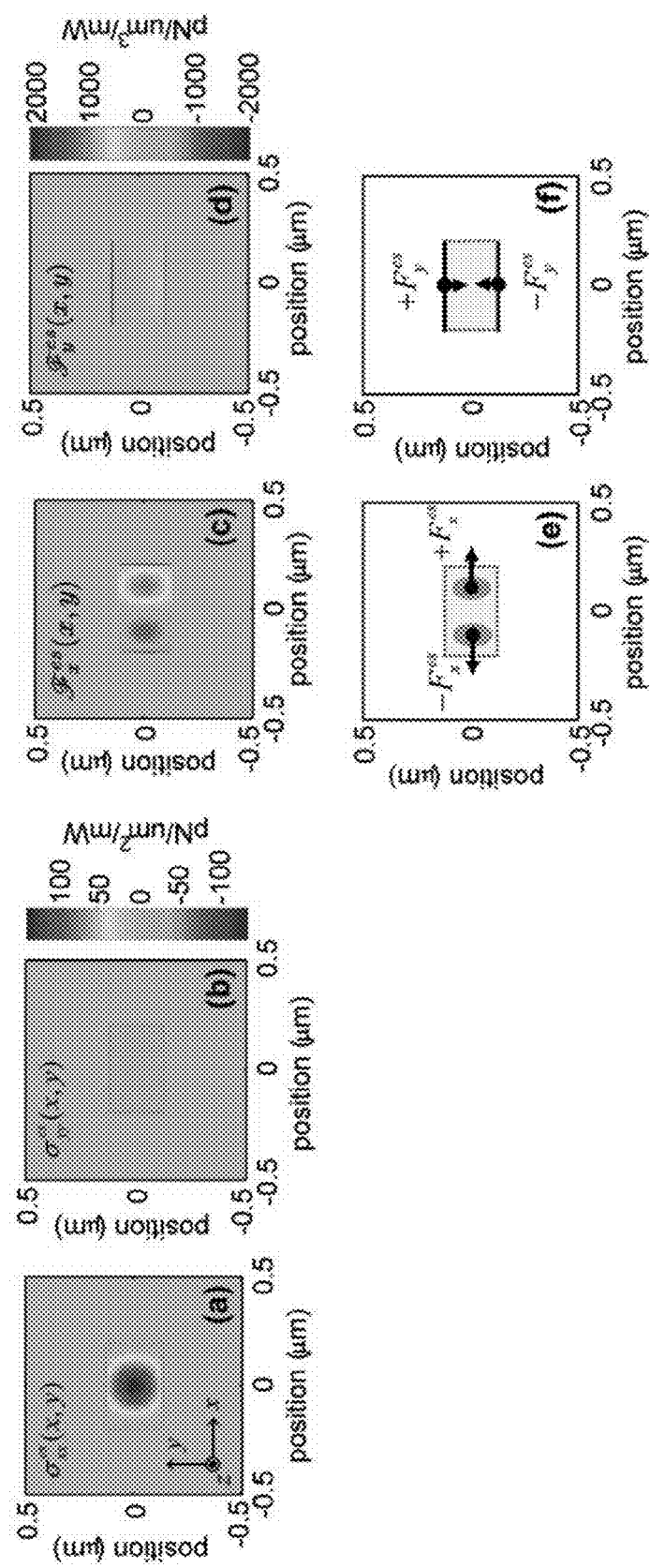
FIGS. 2(*a*) and (*b*) show intensity colormaps of the time averaged $\sigma_{xx}^{es}$ and $\sigma_{yy}^{es}$ component of the stress distribution (units $N/m^2/mW$) induced through electrostriction. The boundary of the waveguides is outlined with a dotted rectangle.

FIGS. 1 and 2 show that both radiation pressure and electrostriction result in nontrivial spatial force distributions within a silicon waveguide. However, their net effect in deforming the waveguide cross-section can be more simply examined through definition of an equivalent surface force. Using the quantities defined above, the magnitude of electrostrictive forces with those of radiation pressure can be compared through an effective surface force. It can be shown that a useful first-order estimate of the aggregate forces which act to deform the waveguide (resulting from either electrostriction or radiation pressure) can be obtained from the spatial averaged stress, which can be defined as $$\overline{\sigma}_{ij} = \frac{1}{a \cdot b} \int_{yvg} \sigma_{ij} \cdot dx dy \quad (11)$$

Here, integration is taken over the waveguide cross-section sketched in FIG. 3.

The significance of $\overline{\sigma}_{ij}$ can be understood through a simple virtual work formulation of the aggregate forces acting to deform the body. A virtual displacement of the waveguide boundaries, δa, and the change in total energy (or virtual work), δU, associated with this displacement can be considered. Through a virtual displacement of the type illustrated in FIG. 3, the waveguide height (b) and length (L) are held fixed, while the waveguide width (a) is varied. In other words, uniaxial tensile strain is applied to the waveguide along the x-axis, transforming a to a'=a+δa and $S_{x,x}$ to $S_{x,x}'=S_{x,x}+\delta S_{x,x}$. For nonzero, $\sigma_{ij}^{opt}$, the virtual work done against optical forces in deforming the body is given by the integral of $\sigma_{xx}^{opt} \delta S_{xx}$ over the volume of the waveguide segment, or $$\delta U_{EM} = \int \sigma_{xx}^{opt} \delta S_{xx} dV \quad (12)$$

$$= \sigma_{xx}^{opt} \delta S_{xx} (a \cdot b \cdot L). \quad (13)$$

Expressing $\delta S_{xx}$ as $\delta S_{xx}=(\delta a/a)$, the principle of virtual work can be used to define the effective aggregate force density acting to deform the waveguide as $$F_x^{opt} = -\frac{1}{L \cdot P}\left(\frac{\delta U_{EM}}{\delta a}\right) = -\frac{\overline{\sigma}_{xx}^{opt} b}{P}. \quad (14)$$

Figures 3A, 3B:
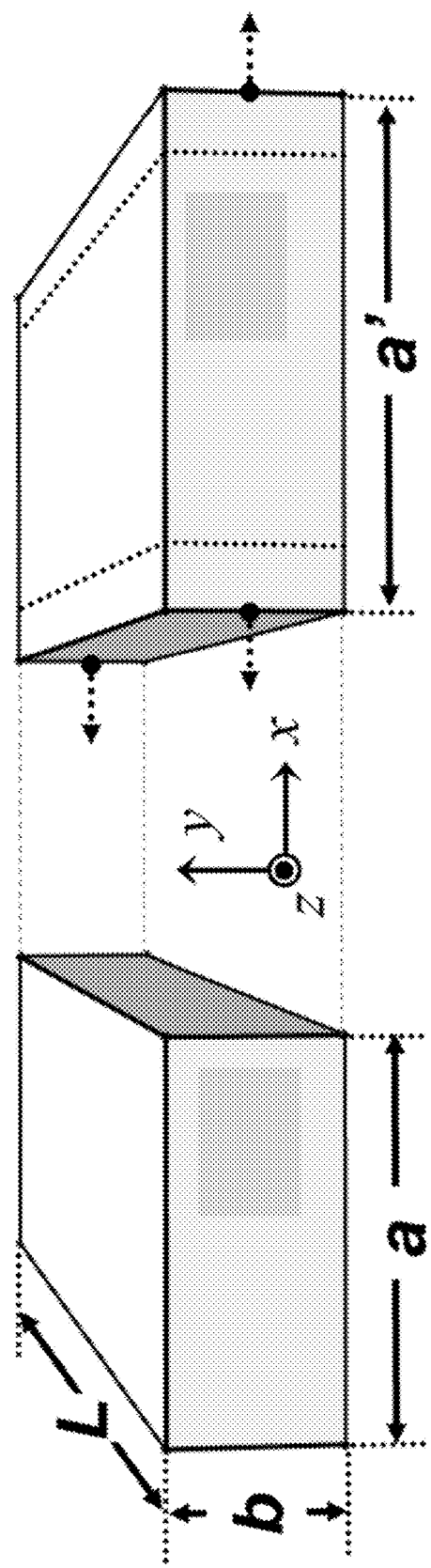
FIG. 3(*a*) shows a rectangular waveguide segment of length, L, width, a, and height, b.

Here, $f_x^{opt}$ represents the power normalized force per unit length acting along the outward normal on the lateral waveguide boundary [as illustrated by the dotted arrows in FIG. 3(b)], which is referred to as the effective linear force density.

From Eq. (14), the effective linear force density corresponding to radiation pressure induced forces acting on the vertical and horizontal boundaries of the waveguide can be expressed as $$f_x^{rp} = -\frac{\overline{\sigma}_{xx}^{rp} b}{P}, \quad (15)$$

$$f_y^{rp} = -\frac{\overline{\sigma}_{yy}^{rp} a}{P}. \quad (16)$$

The analogous linear force density produced by electrostrictive effects is expressible as $$f_x^{es} = -\frac{\overline{\sigma}_{xx}^{es} b}{P} = \frac{\varepsilon_0 \cdot n^4}{2 \cdot P_i \cdot a} \int_{wg} [|E_x|^2 p_{11} + (|E_y|^2 + |E_z|^2) \cdot p_{12}] dx dy, \quad (17)$$

$$f_y^{es} = -\frac{\overline{\sigma}_{xx}^{es} a}{P} = \frac{\varepsilon_0 \cdot n^4}{2 \cdot P_i \cdot b} \int_{wg} [|E_y|^2 p_{11} + (|E_x|^2 + |E_z|^2) \cdot p_{12}] dx dy. \quad (18)$$

Note, the primary difference between Eqs. (17) and (18) is that the $E_x$ field-component (which carries the most of mode energy) interacts through photoelastic coefficient $p_{11}$ instead of $p_{12}$.

The effective linear force densities, defined in Eqs. (15)-(18), are useful in comparing the net effect of both types of forces in deforming the waveguide, since one can compare the force densities from electrostriction and radiation pressure through a similarly defined quantity. It is important to note that these force quantities provides only an approximate measure of the forces acting to deform the waveguide when the waveguide is treated as a lumped element system. This enables one to transform a nontrivial electrostrictive body force into a uniform surface force with approximately equivalent effect in deforming the waveguide. In this section and below, the electrostrictive forces are discussed in terms of this effective surface force, in order to gain a better understanding of the magnitude of electrostrictive forces in comparison to radiation pressure induced forces. A complete model for the treatment of the waveguide deformation resulting from optical forces would require the use of the exact expressions for the electrostrictive stress and Maxwell stress presented in the previous sections.

Using the above relations, a full-vectorial mode solver can now be used to evaluate Eqs. (17) and (18) in a straightforward manner, yielding an approximate comparison between the components of the optical forces resulting from both electrostriction and radiation pressure. The $f_x$ and $f_y$ optical force densities for silicon waveguides of conventional dimensions are examined now. As can be seen in FIG. 4, both components of the optical force (units of pN/μm/mW) were computed as a function of waveguide width, a. The electrostrictive linear force density (dashes), radiation pressure induced linear force density (dots), and total linear force (red) are shown in FIG. 4 for a fixed waveguide height of b=315 nm, and waveguide widths, a, ranging between 100 nm and 500 nm.

Figure 4A:
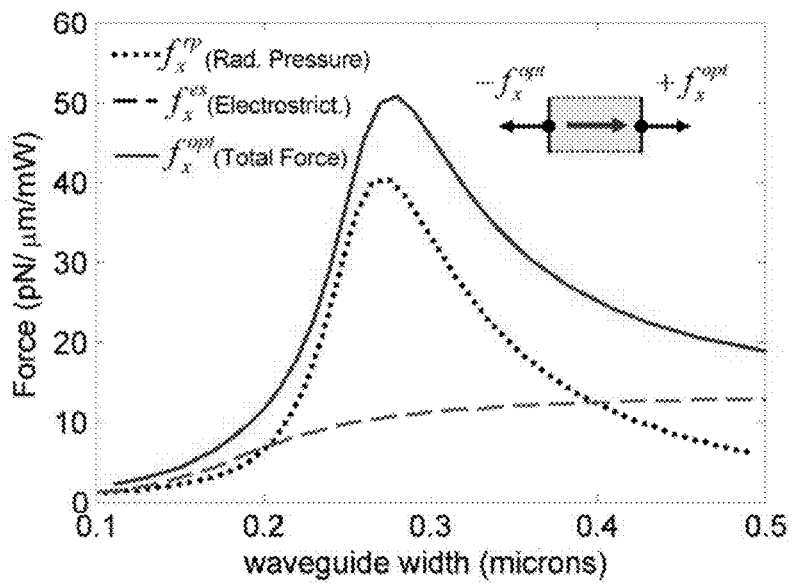
FIG. 4(*a*) is a plot of the linear optical force density (pN/$\mu$m/mW) produced by the TE-like waveguide mode on the lateral boundary of a rectangular waveguide as function of waveguide dimension. The total linear force density (solid), and components due to electrostriction (dashes) and radiation pressure (dots) are plotted as a function of waveguide width (a) for a fixed waveguide height of b=315 nm.
Figure 4B:
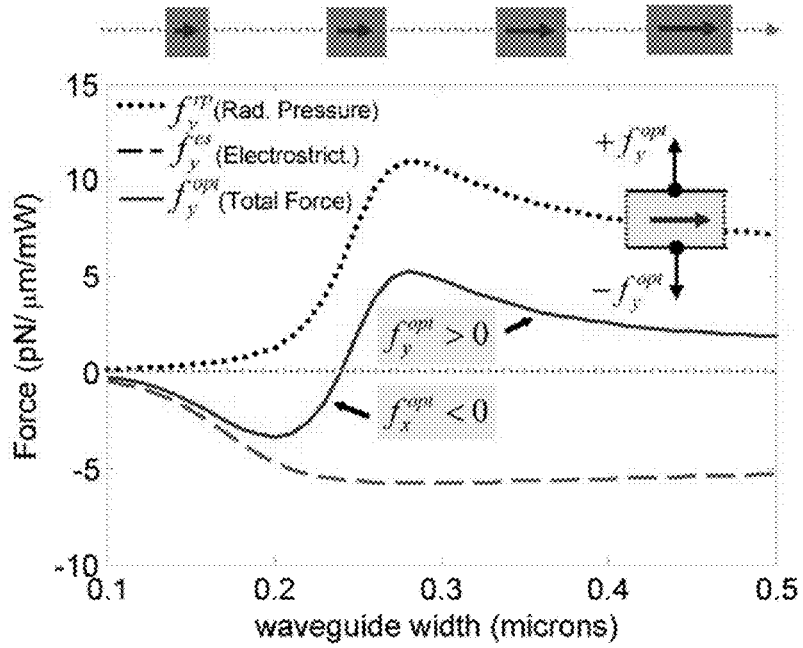

From FIG. 4(a), it can be seen that electrostrictive forces (dashes) and radiation pressure (dots) add constructively, effectively resulting in a larger total outward optical force (solid) on the lateral boundaries of the waveguide. Upon further examination of FIG. 4(a), it can be seen that total optical force takes on a maximum value for a waveguide widths of ~280 nm. The observed peak in radiation pressure is a consequence of the modal expansion at these waveguide dimensions. Remarkably, the effective total force per unit area exerted on the lateral boundary of the waveguide for an incident power of 100 mW approaches $1.6 \times 10^4 (N/m^2)$ at waveguide dimensions of a=280 nm and b=315 nm.

Similarly, the forces exerted on the vertical boundaries of the waveguide can be evaluated through use of Eq. (18), yielding plotted curves seen in FIG. 4(b). From these data, it can be seen that the electrostrictive force (dashed) is opposite in sign to the radiation pressure (dot), causing the total force on the vertical boundary change from attractive to repulsive at a waveguide width of a=240 nm. This change in sign of the electrostrictive force can be understood by examining Eq. (18), and noting that the majority of the electric field-energy in the guided mode resides in the $E_x$ field-component. Given this, one can see from Eq. (18) that the sign difference between $p_{12}$ and $p_{11}$ is responsible for the sign difference between $f_x^{es}$ and $f_y^{es}$. As a consequence, the electrostrictive component of the force acts to pull the vertical waveguide boundaries inward instead of pushing them outward (as they do for the lateral waveguide boundaries).

Finally, it is noteworthy that for waveguide widths of a=290 nm, the optical forces acting on the horizontal boundary vanishes, while those on the vertical boundaries remain quite large. This points to the possibility that, through proper choice of waveguide dimensions, combined forces from electrostrictive and radiation pressure forces can be optimized to achieve the selective excitation of either elastic waves of differing symmetries.

Optical Force Versus Waveguide Aspect Ratio Optimization

Figure 5:
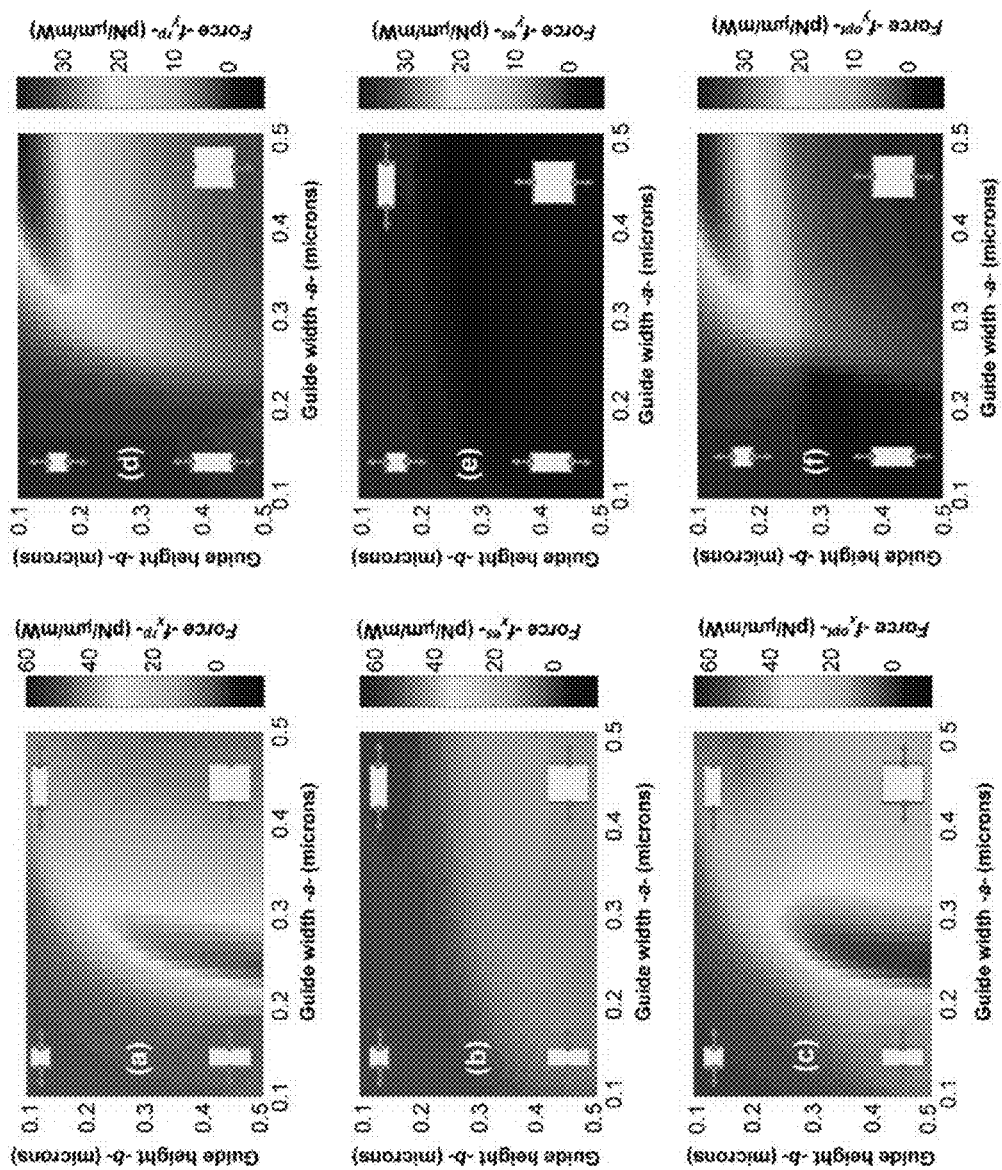
FIGS. 5(*a-f*) are plots showing components of the linear optical force density (pN/$\mu$m/mW) produced by the TE-like waveguide mode on the lateral and vertical boundaries of a rectangular waveguide as function of waveguide dimension.

From the computational example above, it is clear that the magnitude of optical total force exerted on the waveguide boundaries is highly sensitive to waveguide dimensions. In some instances the electrostrictive forces were found to cancel those of radiation pressure, while in others, they add constructively. However, for the purposes of transduction in novel optomechanical systems it is useful to determine the waveguide dimensions which provide a maximum of optical force. Alternately, one might be interested in arriving at a waveguide geometry which is optimized for the transduction of longitudinal waves, and generates virtually no shear motion. Therefore, a computational study of the total optical force exerted to waveguide boundaries by the fundamental TE-like waveguide mode over a large range of waveguide aspect ratios is described below. Through the same methods described above, the various contributions to both $f_x^{opt}$ and $f_y^{opt}$ were computed for waveguides of width, a, and height, b, ranging between 100 nm and 500 nm. The computed components of the linear force density exerted on the lateral and vertical boundaries as a function of waveguide geometry are show as intensity maps in FIG. 5.

FIGS. 5(a), 5(b), and 5(c) are intensity maps showing the radiation pressure component of linear force density ($f_x^{rp}$), the electrostrictive component ($f_x^{es}$), and total optical force density ($f_x^{opt}$) respectively, acting in the lateral waveguide boundary, for waveguides width, a, and height, b, ranging between 100 nm and 500 nm. FIG. 5(a) reveals that the radiation pressure exerted by the TE-like waveguide mode on the lateral boundary reaches a maximum for waveguides which are narrow and tall (e.g., an aspect ratio of ~250:500 nm). In this case, the peak value of the radiation pressure contribution to the force-density approaches 48 pN/μm/mW, which is comparable with the largest forces predicted through evanescent-wave bonding in compound waveguide systems. See M. Povinelli et al., *Opt. Lett.* 30, 3042 (2005). Computation of electrostrictive forces over the same range of dimensions, as shown in FIG. 5(b), reveals that the force exerted on the lateral boundary are positive in sign for all aspect ratios, and monotonically increasing in magnitude for waveguides of increasing width. The result is in an overall increase in the total linear optical force density, as seen in FIG. 5(c) with a maximum linear optical force density on the lateral boundary of 58 pN/μm/mW.

FIGS. 5(d), 5(e), and 5(f) are intensity maps showing radiation pressure component of linear force density ($f_y^{rp}$), the electrostrictive component ($f_y^{es}$), and total optical force density ($f_y^{opt}$) respectively, acting on the horizontal waveguide boundary over an identical range of dimensions. From FIG. 5(d) one finds that the radiation pressure exerted by the TE-like waveguide mode on the vertical boundary reaches a maximum for waveguides which are wide and short (e.g., an aspect ratio of ~500:100 nm). In this case, the peak value of the radiation pressure contribution to the force-density approaches 38 pN/μm/mW. However, FIG. 5(e) reveals that the electrostrictive forces exerted on the vertical boundary are negative in sign for all aspect ratios, and are monotonically increasing for waveguides of increasing width. Since the electrostrictive forces add destructively with the radiation pressure-induced forces, the total linear optical force density is zero, and dips to negative values, as seen in FIG. 5(f).

Material Dependence of Electrostrictive Forces

Thus far, the optically induced forces generated within silicon waveguides (aligned with the [001] crystal orientation) by the TE-like optical mode have been computed. However, the sign and magnitude of the electrostrictive component of the optical force can vary a great deal depending on: (1) the photoelastic tensor (i.e., crystal symmetry, and magnitude $p_{ij}$ elements) for the material of study, (2) the crystal orientation of the waveguide material, and (3) the field distribution of the optical mode under consideration.

Through analysis of the silicon waveguide above, the electrostrictive forces on the horizontal and vertical boundaries were shown to have opposite sign due to differing signs of photoelastic coefficients $p_{11}$ and $p_{12}$. The electrostrictive forces exerted by the TE-like mode on the lateral boundary were shown to push outward, adding to the effects of radiation pressure, and that on the horizontal boundary pushes inward, acting to cancel the effects of radiation pressure. A sketch illustrating the orientation of the electrostrictive forces in the silicon waveguide can be seen in FIG. 6(c). Interestingly, one finds that the electrostrictive force distribution changes significantly with crystal orientation. For instance, a rotational transformation of crystal orientation from [001] to [111] changes the elements of $p_{ij}$, drastically modifying the resulting electrostrictive forces on both boundaries of the waveguide. See, e.g., L. Hounsome et al., *Phys. Stat. Solidi C* 203, 3088 (2006).

TABLE 1

Photoelastic coefficients for select materials.

| Material | Symmetry | $p_{11}$ | $p_{12}$ | $p_{44}$ | Wavelength (μm) | reference |
|---|---|---|---|---|---|---|
| Si | cubic | −0.09 | +0.017 | −0.0151 | 3.39 | 1 |
| Ge | cubic | −0.151 | −0.128 | −0.072 | 3.39 | 2, 3 |
| GaAs | cubic | −0.165 | −0.14 | −0.072 | 1.15 | 3, 4 |
| As$_2$S$_3$ | amorphous | 0.25 | 0.24 | — | 1.15 | 5 |
| Silica | amorphous | 0.121 | 0.27 | — | 0.632 | 4 |

1. D. Biegelsen, *Phys. Rev. Lett.* 32, 1196 (1974).
2. A. Feldman et al., *J. Appl. Phys.* 49, 2589 (1978).
3. M. Gottlieb, "2.3 Elasto-optic Materials," *CRC Handbook of Laser Science and Technology: Optical Materials, Part 2: Properties* 319, (1986).
4. R. Guenther, *Modern Optics*, Wiley (1990).
5. R. Galkiewicz and J. Tauc, *Solid State Commun.* 10, 1261 (1972).

Figure 6:
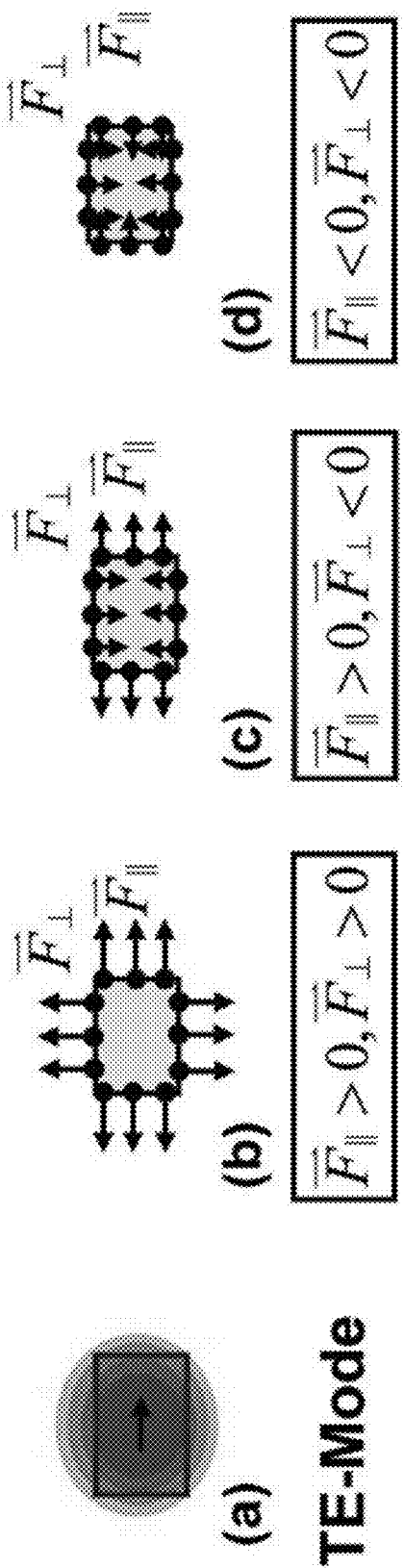
FIG. 6(a) is a schematic illustration of TE-like guided mode in a rectangular waveguide.
FIGS. 6(b), (c) and (d) are schematic illustrations showing the orientation of electrostrictive forces generated by the TE-like mode in GaAs (Ge), Si, and $As_2S_a$ (silica) respectively, through examination of their photoelastic coefficients.

As can be seen in Table 1, the magnitude and sign of the photoelastic coefficients of materials can also vary a great deal. For instance, both $As_2S_3$ and silica have positive $p_{11}$ and $p_{12}$ which will lead to inward electrostrictively induced body-forces in both the x- and y-directions [as illustrated by FIG. 6(d)], which acts counter to the radiation pressure-induced forces of the TE-mode. Interestingly, however, GaAs and Ge possess $p_{11}$ and $p_{12}$ coefficients which are negative in sign. As a consequence, outward electrostrictively induced body forces in both the x- and y-directions can be expected, adding to the effects of radiation pressure [as illustrated by FIG. 6(b)].

Due to the tensor nature of the electrostriction coefficients, the electrostrictive forces can behave quite differently in various materials systems even if they have similar refractive indices. The material dependence of the electrostrictive force component can therefore offer a very useful new means of controlling and tailoring force profiles in optomechanically active waveguide systems. As has already been discussed above, the cancellation of electrostrictive forces on the horizontal boundary of the waveguide may enable the selective excitation of elastic waves of particular symmetries. Further tailoring of the electrostrictive forces can be made through use of waveguides with single or multiple cladding materials, as the different materials interacting with the optical field through the cladding materials will have nontrivial contribution to the total optical force generated through electrostriction.

The electrostrictive and radiation pressure induced forces in a silicon waveguide have been examined in this example since: (1) silicon is the most widely used material in high confinement photonic circuits, and (2) its photoelastic properties are very well known. However, based on the photoelastic properties listed in Table 1, one can easily see that Ge, GaAs, and $As_2S_3$ are far more favorable for the generation of large electrostrictive forces, since all of these materials possess much larger photoelastic coefficients, and both $p_{11}$ and $p_{12}$ are of the same sign for all of these materials. Thus, in contrast to silicon, both terms in Eq. (9) and (10) will constructively add to produce forces which are several times larger than that of silicon. For example, in the case of a Ge waveguide, the electrostrictive forces would scale to values which are ~10× larger than those of silicon, meaning that electrostriction would become the dominant force in this system.

Finally, while photoelastic properties of Si and silica are very well known due to the extensive use of these materials in optics, it should be noted that the photoelastic properties of most other materials are very poorly understood in comparison. Thus, if electrostrictive forces are to be optimally exploited for the generation of large forces and large optomechanical couplings in novel optomechanical systems, further study of the photoelastic properties of high refractive index media is warranted.

Connection Between Radiation Pressure and Dispersion

A general scaling law can be developed to describe the magnitude of optical forces generated in dielectric waveguides that provides an exact relationship between radiation pressure generated by an optical mode and its modal dispersion. This scaling law indicates that highly dispersive waveguides are an optimal choice for the generation of large optical forces in nano-optomechanical systems. Through application of the scaling law to waveguides with circular, rectangular and hexagonal cross-sections, perfect agreement is found between radiation pressure computed from the scaling law and with the numerical evaluation of the Maxwell stress tensor.

As described above, large forces can be generated in nanometer-scale waveguides and cavities as a consequence of the high confinement and tremendous field enhancements produced within such systems. In many cases, such optical forces can significantly impact the mechanics of bodies at micro- and nano-scales, yielding useful mechanical transduction and actuation through use of micro- to milli-watt power levels. See P. Rakich et al., *Nature Photonics* 1(11), 658 (2007); P. Rakich et al., *Optics Express* 17(20), 18116 (2009); M. Li et al., *Nature* 456, 480 (2008); M. Povinelli et al., *Optics Letters* 30, 3042 (2005); and M. Eichenfield et al., *Nature Photonics* 1, 416 (2007).

It has been shown that radiation pressure is highly tailorable, and scales to large values ($10^4 N/m^2$) in the context of high index-contrast (e.g., silicon) optical waveguides. Thus, if properly harnessed, radiation pressure can be exploited to boost photon-phonon coupling to high levels through stimulated Brillouin scattering processes in nanoscale waveguide systems. Below is developed the general form of radiation pressure and its scaling in dielectric waveguides. Utilizing the general properties of optical force distributions, it can be shown that the virtual work performed through geometric scaling of the waveguide can be expressed in terms of waveguide dispersion through the use of response theory of optical forces and the scale invariance of Maxwell's equations. See P. T. Rakich et al., *Opt. Express* 17, 18116 (2009). From virtual work, an exact relationship is derived between radiation pressure and modal dispersion, revealing that the maximally dispersive waveguide mode yields a maximum of radiation-pressure-induced forces.

Figure 7:
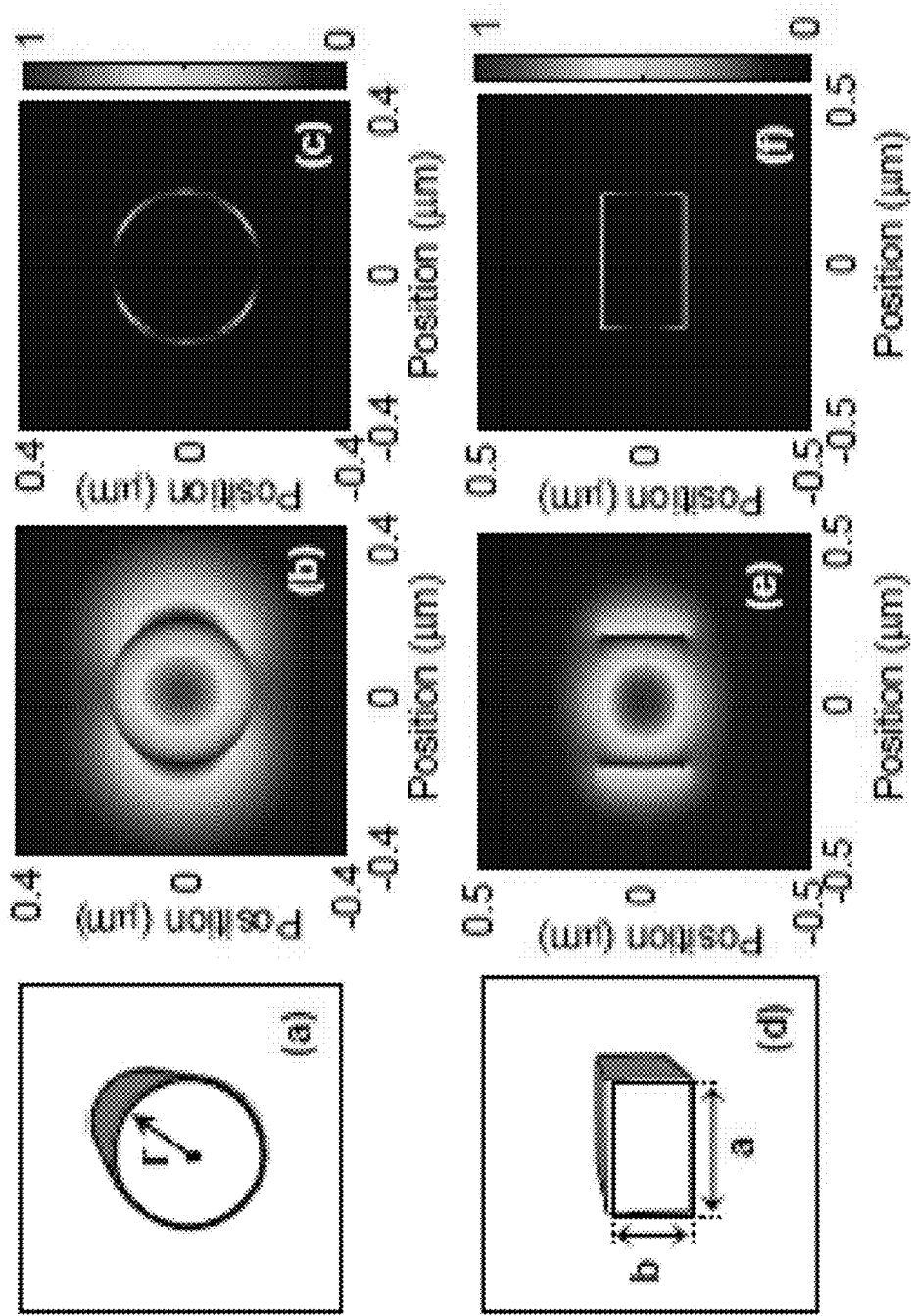
FIG. 7(a) shows a circular waveguide cross section.
FIG. 7(b) shows the computed $E_x$ component of the TE-like mode in the circular waveguide.
FIG. 7(c) shows the computed magnitude of the normalized optical force density in the circular waveguide.
FIG. 7(d) shows a rectangular waveguide cross section.
FIG. 7(e) shows the computed $E_x$ component of the TE-like mode in the rectangular waveguide.
FIG. 7(f) shows the computed magnitude of the normalized optical force density in the rectangular waveguide.

In general, radiation pressure produces forces on the surface of a step-index waveguide. To illustrate this, the optical forces in rectangular and cylindrical silicon waveguides are examined, as seen in FIG. 7, reminiscent of geometries found in silicon photonics and fiber optics. For clarity, only the effect of radiation pressure is considered, and the electrostrictive and magnetostrictive responses of the waveguide materials are neglected. The forces (stresses) within any neutral dielectric system can be computed with the Maxwell stress tensor $$T_{ij} = \varepsilon_0 \varepsilon \left[ E_i E_j - \frac{1}{2} \delta_{ij} |E|^2 \right] + \mu_0 \mu \left[ H_i H_j - \frac{1}{2} \delta_{ij} |H|^2 \right] \quad (19)$$

Here, $E_k$ ($H_k$) is the $k^{th}$ electric (magnetic) field component, $\varepsilon_0$ ($\mu_0$) is the electric permittivity (magnetic permeability) of free space, and $\varepsilon$ ($\mu$) is the relative electric permittivity (magnetic permeability). The force density (force per unit volume), generated by light is computed from $T_{ij}$ as $F_j^{rp} = \partial_i T_{ij}$.

Computed force distributions from the TE-like mode of both waveguides are seen in FIG. 7. FIGS. 7(a)-(b) and (d)-(e) show waveguide cross-section and computed $E_x$, electric field distribution, for rectangular (a=400 nm, b=250 nm) and a cylindrical (r=180 nm) at optical wavelength, $\lambda$=1550 nm. In both structures, the force density clearly concentrates at dielectric interfaces, as seen in FIGS. 7(c) and (f).

From first principles, one can show that optical forces are nonzero only at the discontinuous dielectric boundaries of the waveguide, vanishing within the dielectric volume. See M. Mansuripur, *Opt. Express* 12, 5374 (2004). Next, using the force distribution and applying virtual work, a simple means of computing radiation pressure in waveguides of arbitrary form can be formulated.

Through exact treatment, the optical forces produced by the guided mode of a step-index waveguide can be considered, which carries optical power $P_i$. A virtual displacement of the waveguide boundaries is considered, working against the optical forces, by use of a uniform scale transformation of the form $r \to r' = r \cdot \beta$. Infinitesimal change in geometry is treated by a variation in scale factor ($\delta\beta$). For instance, if $\beta$ is gradually increased from $\beta=1$ to $\beta'=1+\delta\beta$, the critical dimensions of the waveguide are reduced from, d to $d'=d-\delta\beta \cdot d$ (see FIG. 8). This transformation corresponds to a change in total energy (or virtual work), $\delta U$, that is associated with the motion of the waveguide boundaries against optical and mechanical forces.

In general, the displacement-induced change in energy, $\delta U$, will be of the form $\delta U = \delta M_{Mech} + \delta U_{EM}$, where $U_{Mech}$ is the work performed through elastic deformation (in the absence of electromagnetic fields), and $\delta U_{EM}$ is the change in electromagnetic energy resulting from the waveguide deformation. Because the mode exerts pressure (p) only on the waveguide boundaries, $\delta U_{EM}$ resulting from the scale transformation becomes $$\delta U_{EM} = -\int_{\partial wg} p \cdot r \delta\beta dS \qquad (20)$$

Here, $\delta U_{EM}$ is equated to the work done against optical forces by a change in scale factor ($\delta\beta$), and dS is the surface integral of (p·r) at the waveguide boundary ($\partial wg$).

$\delta U_{EM}$ can be related to the phase response of a waveguide segment through response theory of optical forces (see P. T. Rakich, *Opt. Express* 17, 18116 (2009)), revealing that $\delta U_{EM}$ generated through change in coordinate, $\delta q$, reduces to $$\delta U_{EM} = \frac{P_i}{\omega} \cdot \left(\frac{\partial \phi(q)}{\partial q}\right)_\omega \cdot \delta q. \qquad (21)$$

Above, q is a generalized coordinate that affects the phase response, $\phi(q)$, of the system. Here, q may be a waveguide dimension (e.g., a, b, r), a scale-factor ($\beta$), or any other such generalized coordinate affecting the phase response of the waveguide segment. The waveguide segment under consideration may be treated as a reflectionless one-port system with phase response $\phi(q) = (\omega/c) \cdot n_p(q) \cdot L$, where $n_p$ is the phase index (effective index) of the guided mode, c is the speed of light in vacuum, and L is the length of the waveguide segment.

Figure 8:
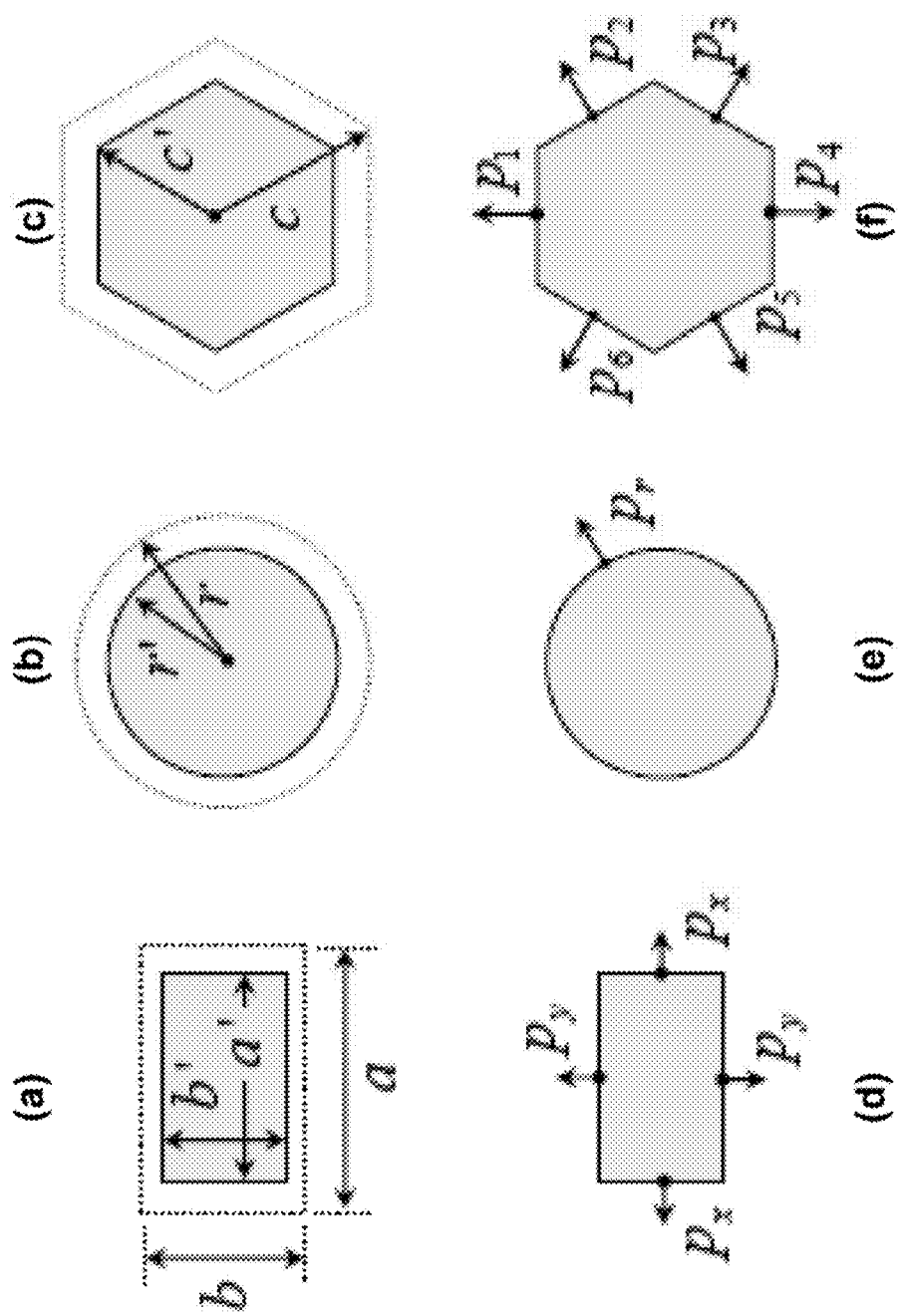
FIG. 8 shows boundary displacements coinciding with variation in scale factor ($\delta\beta$) for (a) circular, (b) rectangular, and (c) hexagonal cross sections, with transformation corresponding to (a,b)→(a',b'), r→r', and c→c'.

The effective index of the waveguide mode is a function of $\in(r)$ and $\omega$, meaning that $n_p$ is generally of the form $n_p = n_p(\in(r), \omega)$. Uniform scaling of the waveguide geometry (as seen in FIG. 8) is performed through a coordinate substitution of the form $r \to r' = r \cdot \beta$, yielding $n_p' = n_p(\in(r'), \omega) = n_p(\in(r \cdot \beta), \omega)$. Taking $\beta$ to be the generalized coordinate which affects the phase response of the system, Eq. (21) can be expressed as $$\frac{\delta U_{EM}}{L} = -\frac{P_i}{c} \cdot \frac{\partial n_p}{\partial \beta} \cdot \delta\beta = -\frac{P_i}{c} \sum_k \frac{\partial n_p}{\partial r_k'} \frac{\partial r_k'}{\partial \beta} \cdot \delta\beta \qquad (22)$$

Combining Eqs. (20) and (22), the following general relationship between the waveguide effective index and radiation pressure for an arbitrary waveguide geometry is obtained:

$$\frac{P_i}{c} \cdot \frac{\partial n_p(\beta)}{\partial \beta} = \int_{\partial wg} p \cdot r dl \qquad (23)$$

The right hand side of Eq. 4 is a line-integral (dl) of p·r around the waveguide boundary ($\partial wg$) in the x-y plane.

Next, Eq. (23) is used and the scale invariance of Maxwell's equations is invoked, to derive an exact relationship between the waveguide dispersion and the radiation pressure. From the scale invariance of Maxwell's equations, it is known that any eigenfunction of the electromagnetic wave equation remains invariant under simultaneous coordinate and frequency transformation. The eigenmodes of the dielectric waveguide, $E_m(r)$, satisfy $$[(c/\omega)^2 \cdot \nabla_\perp^2 - \in(r)]E_m(r) = n_p^2 E_m(r) \qquad (24)$$

Here, $\nabla_\perp = \nabla - \hat{z}(\nabla \cdot \hat{z})$. Next, a new form of the wave equation is examined in which the waveguide dimensions are transformed by a scale factor, s. The scaled waveguide is assumed to have dielectric distribution $\in(r) \to \overline{\in}(r) = \in(r \cdot s)$. Applying simultaneous coordinate and frequency scaling of the form $r \to \bar{r} = r/s$, $\nabla \to \overline{\nabla} = \nabla/s$, and $\omega \to \overline{\omega} = \omega/s$ and substituting $\overline{\in}(r) = \in(r \cdot s)$, Eq. (21) becomes $$= (c/\overline{\omega})^2 \cdot \overline{\nabla}_\perp^2 - \overline{\in}(r)]E_m(\bar{r} \cdot s) = n_p'^2 E_m(\bar{r} \cdot s) \qquad (25)$$

It should be noted that $n_p$ and $n_p'$ are both explicit functions of $\omega$ and $\in(r)$. Comparing Eqs. (24) and (25), it can be seen that the eigenmode of the dimensionally scaled waveguide is simply a scaled version of the original eigenmode, evaluated at frequency $\overline{\omega} = \omega \cdot s$, with eigenvalue $n_p'$. From Eqs. (24) and (25), one can show that $n_p' = n_p$. More explicitly, $$n_p(\in(r), \omega) = n_p(\overline{\in}(r), \overline{\omega}) = n_p(\in(r \cdot s), \omega \cdot s) \qquad (26)$$

Letting $s = \beta$, substitute $r' = r \cdot \beta$ and $\overline{\omega}' = \overline{\omega} \cdot \beta$ into Eq. (26). Thus, expanding Eq. (26) with respect to $\beta$ yields $$\sum_k \frac{\partial n_p}{\partial r_k'} \frac{\partial r_k'}{\partial \beta} = -\frac{\partial n_p}{\partial \omega'} \frac{\partial \omega'}{\partial \beta} \qquad (27)$$

Substituting Eqs. 8 and 4, and taking $\beta = 1$, provides $$\frac{P_i}{c} \cdot \frac{\partial n_p}{\partial \omega} \cdot \omega = \frac{P_i}{c}(n_g - n_p) = P_i \left[\frac{1}{v_g} - \frac{1}{v_g}\right] = \oint_{\partial wg} p \cdot r dl \qquad (28)$$

Here, $v_g = c/n_g$, $v_p = c/n_p$, and the definition of modal group index, $n_g = [n_p + \omega(\partial n_p / \partial \omega)]$, was used to relate dispersion to $(n_g - n_p)$. The above is a surprisingly simple and general relationship between the modal dispersion of an arbitrary waveguide mode and the line integral of radiation pressure about the boundary of the waveguide. Eq. (28) is valid for any lossless nonradiative mode. Note, however, that $n_g$ ($n_p$) is the group (phase) index as computed from the waveguide dispersion; $n_g$ ($n_p$) does not include the effects of material dispersion. Furthermore, since material dispersion does not enter the Maxwell stress tensor, Eq. (28) is valid independent of material dispersion. Interestingly, Eq. (28) reveals diverging optical forces for vanishing modal group velocities, similar to the special case of M. Povinelli et al.

Next, the implications of Eq. (28) on waveguides with circular, rectangular, and N-sided polygonal cross sections are examined. For a circular waveguide of radius r, (see FIGS. 7 and 8) an expression for the spatially averaged radiation pressure, $\bar{p}_r$, in the outward radial direction, is found $$\bar{p}_r = \frac{1}{2} \cdot (n_g - n_p) \cdot [P_i / (c \cdot A_{wg})]. \tag{29}$$

For a rectangular waveguide, seen in FIG. 8, the sum of the spatially averaged radiation pressures acting on the lateral ($\bar{p}_x$) and horizontal ($\bar{p}_y$) boundaries is found to be $$(\bar{p}_x + \bar{p}_y) = (n_g - n_p) \cdot [P_i / (c \cdot A_{wg})]. \tag{30}$$

For N-sided equilateral polygons (see hexagonal example in FIG. 8), a more general reading of the scaling is $$\sum_{k=1}^{N} \bar{p}_k = (n_g - n_p) \cdot [P_i / (c \cdot A_{wg}) \cdot N/2]. \tag{31}$$

Here, $\bar{p}_k$ is the spatially averaged radiation pressure over the $k^{th}$ face of the polygon, and for Eqs. (29-31), $A_{wg}$ is taken to be the cross-sectional area of the waveguide.

Figure 9:
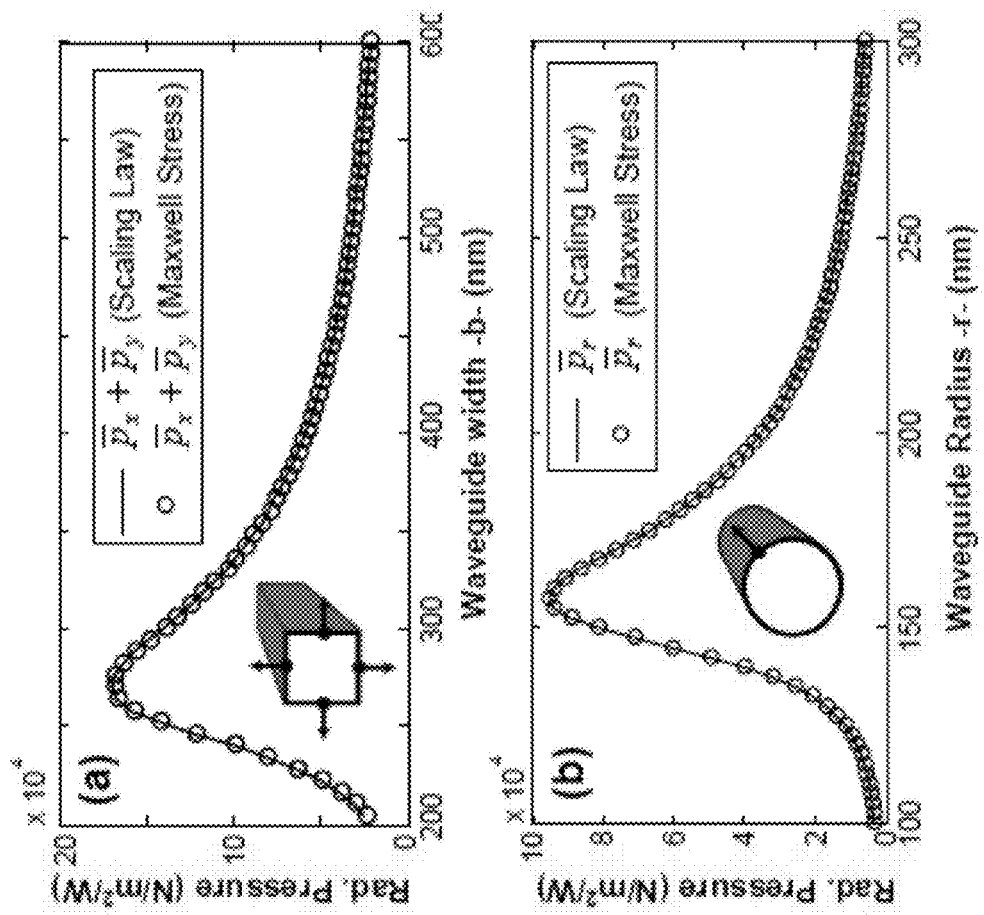
FIG. 9 shows plots of radiation pressure of (a) circular and (b) rectangular waveguides computed via Maxwell stress tensor (circles) and the analytical scaling laws (solid curve).

Using a full-vectorial mode solver, comparison of Eqs. (29-31) with numerically evaluated Maxwell stress tensor calculations can be made. FIG. 9(a) shows $\bar{p}_r$ as computed from Eq. (29) (solid curve) and the Maxwell stress tensor (circles) for various waveguide radii, revealing perfect agreement between the two methods. Here, Eq. (29) was evaluated using the computed eigenvalues ($n_p$, $n_g$) of the fundamental TE-like mode, while the Maxwell stress tensor was evaluated using field values ($E_i$, $H_i$) produced by the same numerical model. FIG. 9(b) shows a similar perfect agreement between the scaling law [Eq. (30)], and the Maxwell stress tensor calculation as the width of a rectangular waveguide is varied. Here, the waveguide height was fixed to 315 nm.

The above-derived exact scaling law relates the dispersion of a guided mode to the magnitude of optical forces generated by radiation pressure. This relation is entirely general, describing the forces due to any mode within a step-index waveguide of arbitrary shape. Finally, the perfect agreement between the scaling law and first-principles calculations points to highly dispersive waveguides as an optimal choice for enhancement of forces in nano-optomechanical systems.

In summary, the optical forces and stresses generated by light within a waveguide can be optimized (or maximized) to exhibit a maximum of optical force. Optimization of the wave transduction can be obtained through a choice of dimensions which tailors the force distribution to selectively excite a particular elastic wave (e.g., transverse or longitudinal). This optimization may also consist of a maximization of overall force. For translationally invariant waveguides, the maximal radiation pressure is generated for a waveguide mode which is maximally dispersive. Electrostrictive forces are maximal where group index is a maximum.

Example

Optomechanical Delay Line

The conversion from the acoustic to the optical domain can essentially be understood as a phase modulation resulting from mechanical distortion of an optical waveguide. Conversion of both optical and RF signals to the acoustic domain has some unique benefits in the context of delay lines since acoustic signals experience very low loss, propagate very slowly (making smaller footprint devices possible), and enable extremely large delays due to the high material Qs. Therefore, this transduction technology can provide wideband and flat group delay with low insertion loss, all in a low-power, compact, chip-scale process technology.

Figure 10:
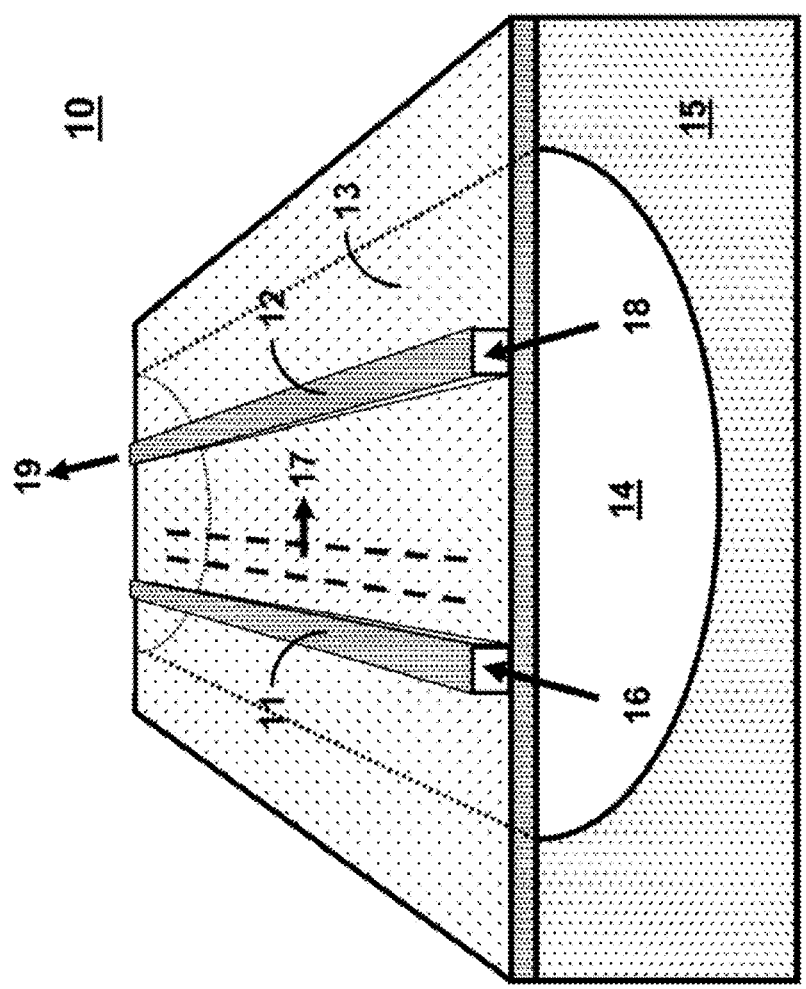
FIG. 10 is a perspective end view schematic illustration of an exemplary optomechanical delay-line device.

As an example embodiment of the present invention, an optomechanical delay line enables the merger of optical and phononic signal processing functionalities through CMOS compatible fabrication processes. FIG. 10 shows a schematic illustration of an exemplary optomechanical delay-line device 10 comprising opposing transducing and receiving optical waveguides 11 and 12, respectively, which are mechanically coupled to a suspended phononic membrane 13 and separated from each other by an acoustic delay length. The waveguides 11 and 12 are preferably substantially parallel, but can also be angled with respect to each other. The waveguides 11 and 12 can be designed to optimize the transducer geometry (e.g., to optimize the radiation pressure and electrostrictive forces, as described above). The membrane can be suspended over a cavity or trench 14 formed in a substrate 15. Optical forces, resulting from an input optical signal 16 traveling through the transducing optical waveguide 11 induce motion in the waveguide boundaries, generating an acoustic wave 17 in the suspended phononic membrane 13. In operation, the input signal 16 can be an optically encoded signal. An optically encoded signal can be produced by an optical pulse train, modulation of an input signal, or coherently mixing two signals to produce a beat signal. Data encoded on the optical signal 16 yields a modulation in the optical forces produced in the waveguide 11, generating a longitudinal and/or transverse acoustic wave 17 which is nearly an exact acoustic image of the optically encoded data. The resulting acoustic signal propagates in the suspended membrane 13 from the transducing 11 to the receiving 12 waveguide incurring a phase and group delay through propagation. Once the acoustic signal 17 reaches the receiving waveguide 12 (at which point it can experience a delay of between 100 ns–1 µs), the acoustic signal is then converted back into the optical domain, which encodes the acoustic data onto a continuous wave optical signal 18 traveling in the receiving waveguide 12 to produce a modulated output optical signal 19.

The optical signals that are coupled into the waveguides for the purpose of transduction are preferably low noise, narrow-band signals before they are encoded by either phase or amplitude modulation (for example, with a lithium niobate phase or amplitude modulator, with an electrooptic modulator, electroabsorption modulator, acoustooptic modulator, or any other such modulator). Optical signal sources can include, for example, solid state lasers, semiconductor lasers, gas lasers, dye lasers, or lasers comprising any other gain medium.

Preferably, a single-mode waveguide can be used for signal transmission to maintain uniform signal transduction along the length of the guided-wave system (e.g., fundamental TE-mode excited by both signals). For the purpose of this description, a rectangular waveguide is single mode when it possesses either a single TE-like waveguide mode or only two orthogonally polarized TE- and TM-like modes which do not readily couple to one another without extraordinary circumstances (e.g., a grating coupler, adiabatic rotator, etc.).

The dimensions of the waveguide can be selected to achieve single mode operation for a wavelength of interest and to optimize the optically induced forces for the type of acoustic wave that is desired to be generated. The cross-sectional dimension can be comparable to the wavelength of light to provide high forces and exhibit single mode performance. For example, if only a longitudinal acoustic wave and no transverse acoustic wave is desired, a silicon waveguide of width, a=240 nm, and height, b=315 nm, would be optimal at a wavelength of λ=1.5 μm, since the force on the horizontal boundaries would be near zero whereas those on the lateral boundaries would be large. However, waveguide dimensions can include rectangular waveguides of a number of aspect ratios.

To efficiently generate an acoustic signal from the optical-domain signals propagating within the waveguide system, the optical signals preferably reach a critical power at which an interaction length is possible. The effective interaction length is generally limited by the degree of the optical losses induced in the waveguide by roughness-induced scattering losses, material-induced absorption or scattering losses, waveguide bending losses, and modal leakage due to coupling to radiation losses, coupling to substrate modes, or to unwanted waveguide modes.

Optimal operation or efficient coupling from optical to acoustic domains generally requires the largest possible optically induced forces and low losses to achieve large effective interaction lengths. Higher refractive index-contrast waveguides generally provide higher optical forces at their optical boundaries. Therefore, step-index silicon waveguides, which can provide an index contrast of 1:3.5, are capable of larger forces than silicon nitride, which can provide index contrast of 1:2.0 at near-infrared wavelengths. However, other waveguide materials can also be used including, but not limited to, germanium, SiGe, $As_2S_3$ glasses or other chalcogenide glass compositions, diamond, SiC, and GaAs or other III-V semiconductor compounds.

The loss requirements on the receiving waveguide are similar to those of the transducing waveguide. Therefore, the losses are preferably low to efficiently convert signals from the acoustic domain back into the optical domain and, since the system is reciprocal, the receiving waveguide acts as an optimal receiver for similar dimensions for which the transducing waveguide acts as an optimal transducer.

Although a rectangular waveguide is described above, other types of waveguides can also be used that can generate an optomechanical transduction. For example, the waveguide can comprise an evanescently-coupled compound or dual waveguide, circular waveguide, or any waveguide having a step-index cross-section that possesses a guided eigenmode.

The suspended membrane can be a thin material that propagates an acoustic wave, including semiconductors, insulators, glass, or polymers. For example, the membrane can comprise silicon dioxide, silicon nitride, silicon carbide, alumina, or aluminum oxide. The acoustic signal attenuation is preferably negligible in the phononic membrane material at the 100 ns time-scale. For example, the slow signal velocities afforded by acoustic wave propagation enables 100 ns delays over acoustic propagation lengths of only about 600 μm.

The device can further comprise a cladding layer on the waveguides and/or suspended membrane. The optomechanical coupling of the waveguide to the delay line system can also include the electrostrictive properties of the underlying suspended membrane and overlying cladding layer.

Figure 11:
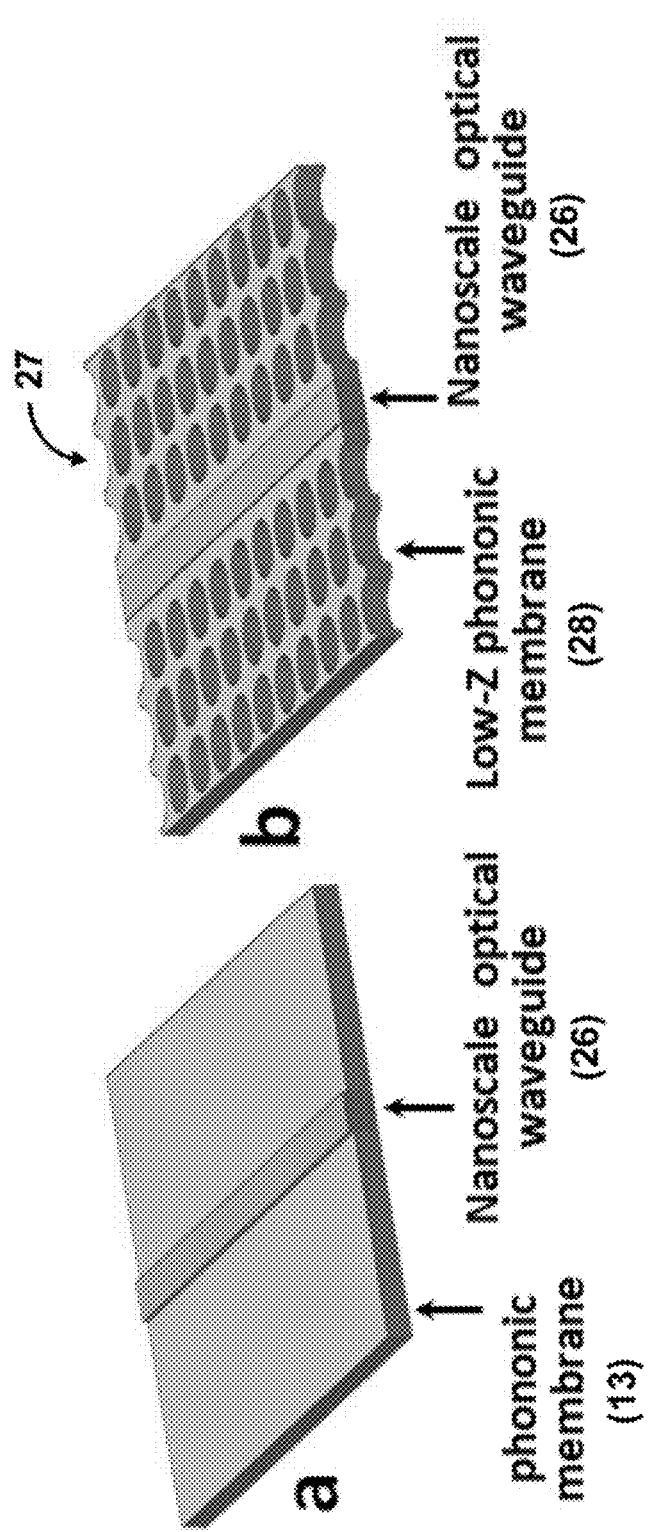
FIG. 11(a) is a schematic illustration of an optical waveguide embedded in a phononic membrane.
FIG. 11(b) is a schematic illustration of a optical waveguide embedded in a low-Z phononic crystal membrane.

The optical waveguide can be embedded in the suspended membrane 13, as shown in FIG. 11(a). Such an embedded waveguide 26 can provide a more optimal optomechanical transduction. When the waveguide is embedded in the membrane, the guidance of light in the waveguide can occur through total internal reflection (i.e., by using two different materials with differing refractive index) or through Bragg reflection from a periodic modulation of the refractive index within the membrane.

One or both of the waveguides can be surrounded by an acoustic reflector. For example, the acoustic reflector can comprise an air gap, a phononic bandgap crystal or material, a Bragg reflector, or any medium that provides a sufficiently large impedance mismatch to achieve high acoustic reflection.

The membrane around the waveguide can be patterned to provide favorable transduction properties, such as low mechanical impedance or resonance. The low impedance effective medium of the low-Z phononic membrane 28 can comprise a nanostructured material, or a phononic crystal comprising a periodic array 27 of scatterer inclusions, as shown in FIG. 11(b). These inclusions may be any shape and can be unfilled (as shown) or filled with a combination of materials or alloys. See U.S. Pat. No. 7,733,198 to Olsson et al., which is incorporated herein by reference.

Alternatively, one or both of the waveguides can be surrounded by acoustic absorber. For example, the acoustic absorber can comprise a damping material, such as a polymer, a liquid, or any medium that provides a sufficiently large impedance mismatch to achieve high acoustic absorption.

The delay line can also comprise a cavity between the transducing and receiving waveguides for manipulation of the acoustic signal propagating therein. For example, the cavity can be formed with a phononic crystal, grating, or other acoustic signal processing means.

Fabrication of an Exemplary Optomechanical Delay Line

An exemplary optomechanical delay-line device can be fabricated using commercial bulk CMOS processing. For example, a method to fabricate strong-confinement polysilicon waveguides on a shallow trench isolation (STI) layer (<400 nm of oxide) has been described by Holzwarth et al. Without post-processing of the standard bulk CMOS stack up to create an air tunnel beneath a polysilicon waveguide, the optical mode guided by the waveguide would leak through the thin oxide layer into the high-index silicon substrate. However, when the waveguide is supported by an STI layer above an air tunnel trench in the substrate, the propagation loss in the waveguide can be very low (e.g., approximately 10 dB/cm at 1550 nm). See C. W. Holzwarth et al., "Localized Substrate Removal Technique Enabling Strong-Confinement Microphotonics in Bulk Si CMOS Processes," Paper CThKK5, Conf. on Lasers and Electro-Optics (2008), which is incorporated herein by reference.

Figure 12A:
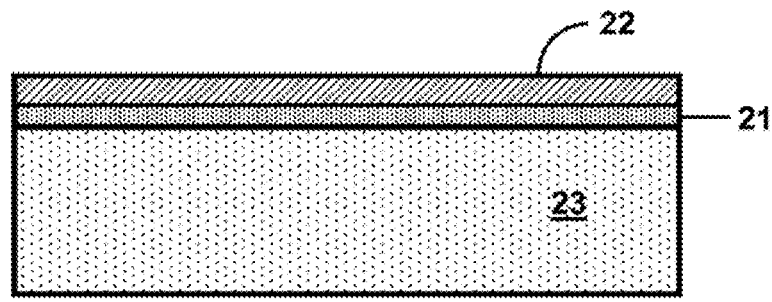
FIGS. 12(a)-(d) illustrate an exemplary method to fabricate an optomechanical delay-line device.
Figure 12B:
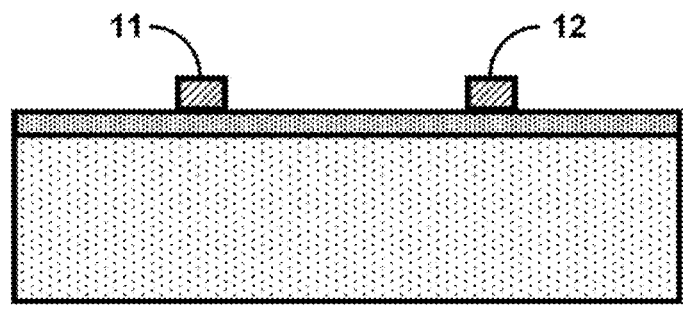
Figure 12C:
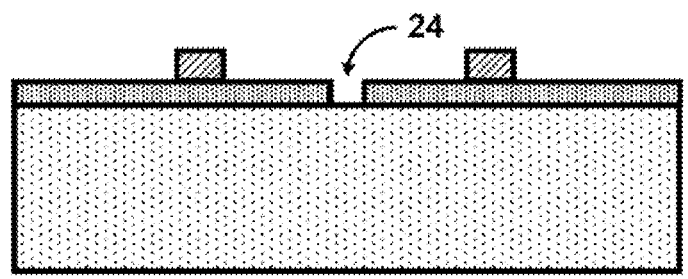
Figure 12D:
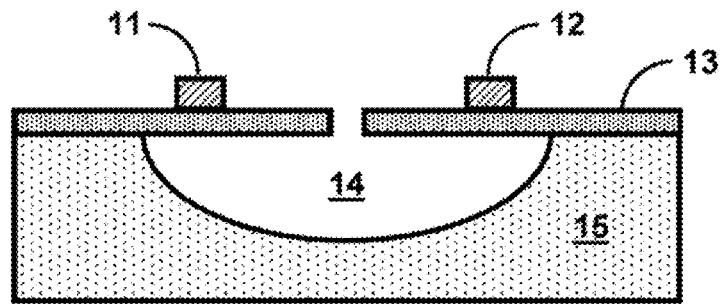

The process for fabricating an optomechanical delay-line device can use a commercially available silicon-on-insulator (SOI) wafer. As shown in FIG. 12(a), a SOI wafer comprises a top silicon layer 22 separated from a silicon substrate 23 by a buried $SiO_2$ (BOX) layer 21. With commercial SOI wafers, the top silicon layer 22 is typically less than 500 nm thick, the BOX layer 21 is typically less than 400 nm thick, and the silicon substrate 23 is normally around 600 μm thick. As shown in FIG. 12(b), silicon waveguides 11 and 12 can be formed in the top silicon layer 22 by patterning a photoresist using photolithography (e.g., e-beam lithography, nano-imprint, or any other such lithographic patterning technique) and transferring the pattern into the top silicon layer using reactive ion etching. As shown in FIG. 12(c), a second lithographic step can be performed to open a plurality of etch holes 24 in the oxide layer 21 between the waveguides 11 and 12 to expose the silicon substrate 23. As shown in FIG. 12(d), the wafer can then be exposed to a $XeF_2$ isotropic etch until the substrate is locally removed underneath the waveguides. The resulting optomechanical delay line comprises substantially parallel optical silicon waveguides 11 and 12 which are mechanically attached to a $SiO_2$ phononic membrane 13 that is suspended over a trench 14 formed in a silicon substrate 15.

This fabrication process eliminates leakage of the guided wave to the substrate and enables waveguides of arbitrary shape that are mechanically stable.

In addition, for the structural integrity and uniformity of waveguide, additional layers or structures can be used for strain relief. For instance, the silica membrane tends to have large compressive stresses when released in the manner outlined above. However, deposition of a layer of an additional material (which possesses tensile stress) can neutralize the compressive stress that may otherwise be problematic.

Figure 13A:
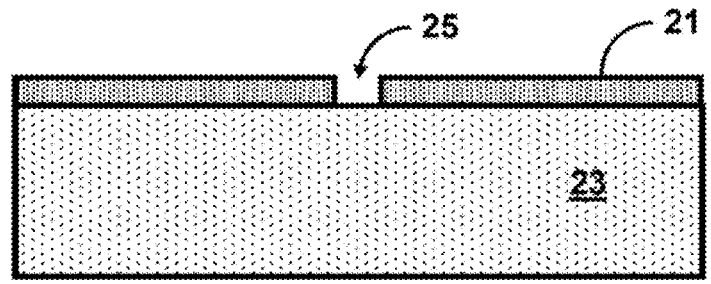
FIGS. 13(a)-(d) illustrate an exemplary method to fabricate a nano-optomechanical transducer comprising an embedded optical waveguide and a phononic crystal in a low-impedance phononic membrane.
Figure 13B:
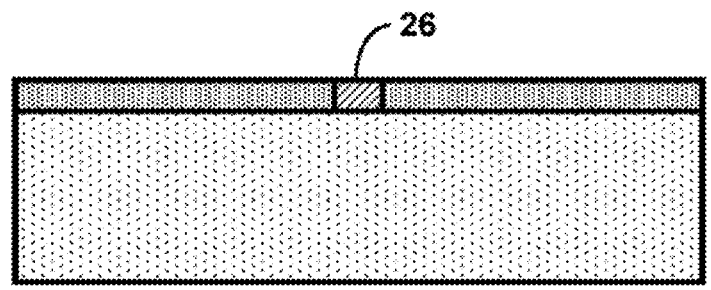
Figure 13C:
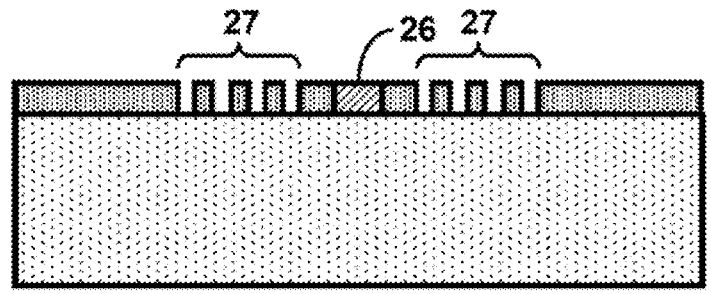
Figure 13D:
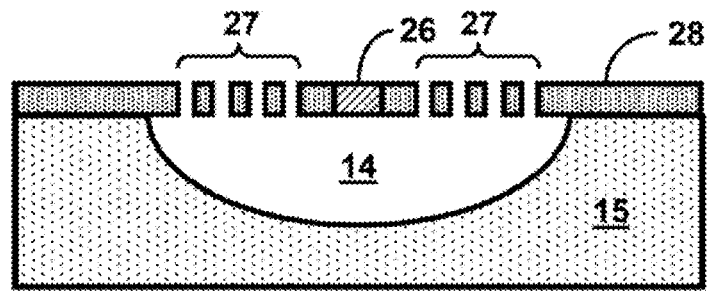

Rather than forming the waveguides on top of the phononic membrane, the optical waveguide(s) can be embedded in the membrane by etching a channel(s) 25 into the membrane layer 21, as shown in FIG. 13(a). The channel 25 can then be backfilled with an optical waveguide material 26, as shown in FIG. 13(b). To form a low-Z phononic membrane, a periodic two-dimensional array of holes 27 can be etched in the membrane layer 21, as shown in FIG. 13(c). The holes can be unfilled to provide a 2D periodic array of air holes (as shown), or the holes can be filled with a scatterer material that has a density and/or elastic constant that is different than the membrane material, therefore providing a phononic crystal in the low-Z phononic membrane 28. See U.S. Pat. No. 7,836,566 to Olsson et al., which is incorporated herein by reference. As shown in FIG. 19(d), the substrate 23 can then be exposed to an isotropic etch until the substrate is locally removed underneath the phononic membrane. The resulting optomechanical transducer comprises an embedded optical waveguide 26 surrounded by phononic crystals 27 in a low-Z phononic membrane 28 suspended over a trench 14 formed in a substrate 15.

Mach-Wave Nano-Optomechanical Transduction

The challenges associated with broadband stimulated phonon emission in optomechanical systems arise from: (1) limited optical forces, and (2) the high mechanical impedance of naturally occurring media. One can show the maximum driving force produced by light within any optomechanical system is fundamentally limited by the optical power and energy density limitations of optical materials. See B. Jalali et al., *IEEE Journal of Selected Topics in Quantum Electronics* 12 (6), 1618 (2007). Consequently, radiation pressure is restricted to a maximum value of $10^4$ (N/m$^2$) within materials such as silicon. This limit can be termed the "Radiation-Pressure Limit". With this practical limitation in mind, one can prove that the maximum transduction bandwidth and phononic power output (i.e., photon-phonon coupling) of any optomechanical device is determined by: (1) the maximum possible magnitude of radiation pressure, (2) the device dimension, and (3) the effective mechanical impedance. Thus, to attain the broadband photon-phonon coupling necessary for chip-scale RF signal processing, the present invention tailors the mechanical impedance and optical forces in broadband traveling-wave device topologies with scalable interaction length.

The present invention provides a new mechanism for the generation and manipulation of phonons with light that enables: (1) broadband optomechanical transduction via pulsed phonon emission and capture, (2) pulsed picosecond mode-locked phonon-lasers, (3) broadband optomechanical phonon modulation, (4) widely tunable phononic oscillators, and (5) broadband phonon amplification. These novel device geometries exploit both impedance engineered phononic media and nano-enhanced optical forces from radiation pressure and electrostriction. As described below, broadband Mach-wave nano-optomechanical transducer of the present invention can provide the basis for a powerful new chip-scale phononic-domain signal processing platform. Ultrahigh bandwidth true time delay (TTD) and RF signal processing can address RADAR and communications using this device physics. In particular, optically-induced ultra-broadband stimulated Mach-wave phonon emission in nanoscale hybrid photonic-phononic waveguide geometries can provide efficient and high output chip-scale phonon generation. These ultra-broadband stimulated phonon emission devices utilize low impedance effective phononic media, synergistic design of electrostriction and radiation pressure to boost and tailor forces, increased interaction lengths, and highly dispersive electromagnetic modes for optical force enhancement.

Low-Impedance Phononic Media

Figure 14:
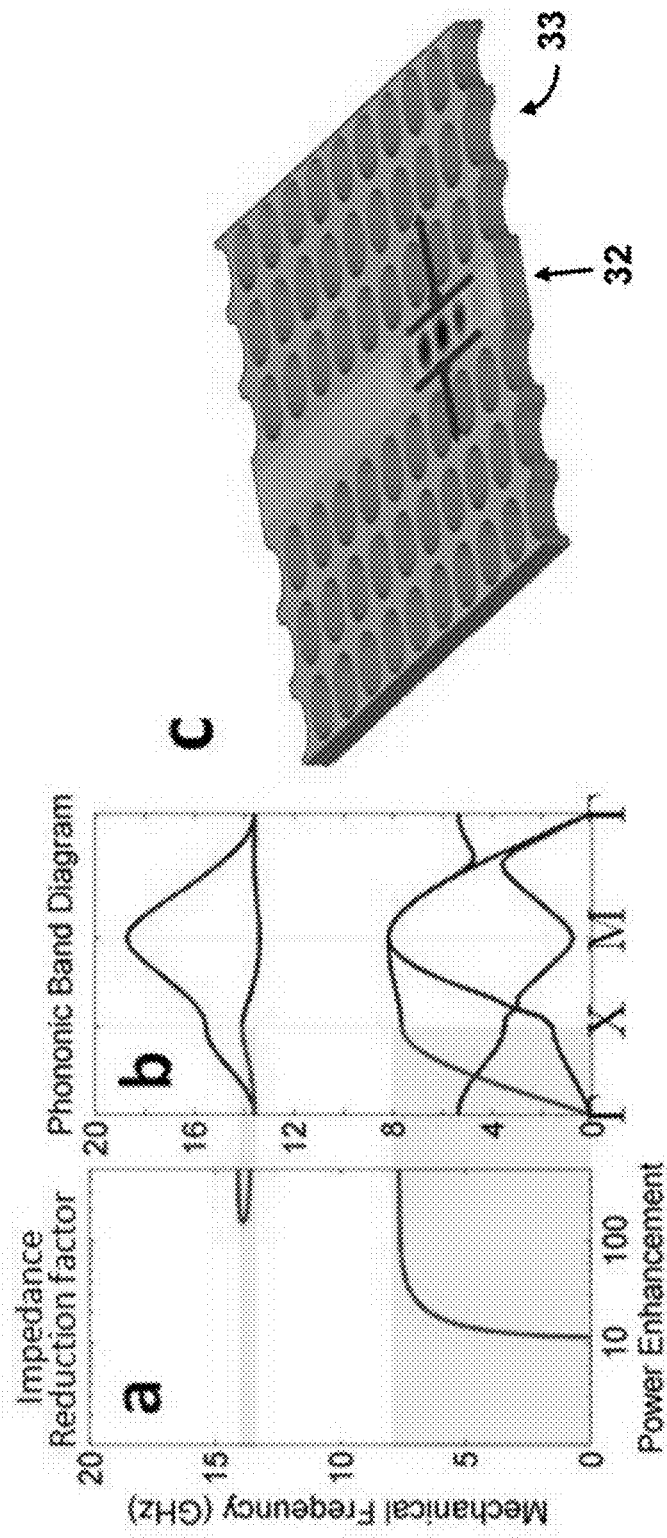
FIG. 14(a) is a graph of phonon-photon coupling enhancement (impedance reduction) due to phononic dispersion in a phononic crystal.
FIG. 14(b) is a phononic band diagram showing magnified view of bands from Γ→X of a phononic crystal membrane with r/a=0.9.
FIG. 14(c) is a schematic illustration of a Mach-wave device comprising a waveguide embedded in a low-Z phononic crystal membrane.

In contrast to resonant systems, dramatic enhancements in photon-phonon coupling can be achieved over large bandwidths through use of low phononic impedance (Z) effective media. Since it is more difficult to transduce waves in high stiffness or high impedance media, the strength of photon-phonon coupling in all optomechanical systems can be shown to scale as 1/Z. As a consequence, it is exceedingly difficult to transduce into conventional low-loss phononic media, virtually all of which have high impedance. To overcome this difficulty, the dispersive properties of phononic crystals can be used to create low-impedance phononic effective media. FIG. 14(c) shows an optomechanical transducer that uses the strong interaction of a guided optical mode propagating in an embedded optical waveguide 32 with a low-Z photonic crystal membrane 33, yielding improved quantum efficiencies. FIG. 14(b) is a phononic band diagram showing magnified view of bands from Γ→X of a 2D phononic crystal membrane with r/a=0.9, where r is the scatter radius and a is the lattice constant. FIG. 14(a) shows the computed mechanical impedance of a patterned silicon nitride membrane, indicating that the impedance of the membrane can be reduced by factors of 10 over large frequency ranges (e.g., from 0-7 GHz) by patterning into it a rectangular phononic crystal. The computed impedance reduction factor (Z/Z') indicates that the power transduced for a given optical force can be increased by factors of 10-20 over large bandwidths when the nano-optomechanical transducer is coupled to a phononic crystal membrane. Thus, by incorporating broadband low-Z media within Mach-wave device designs, the effective impedance of the medium into which the Mach-waves are transduced can be reduced by factors of 10-20, increasing the optomechanical gain coefficient over large frequency ranges. Such dramatic impedance reductions yield fundamental improvement in bandwidth-efficiency products $\Delta\Omega \cdot \eta$ by factors 20-40 over resonant systems.

Figure 15:
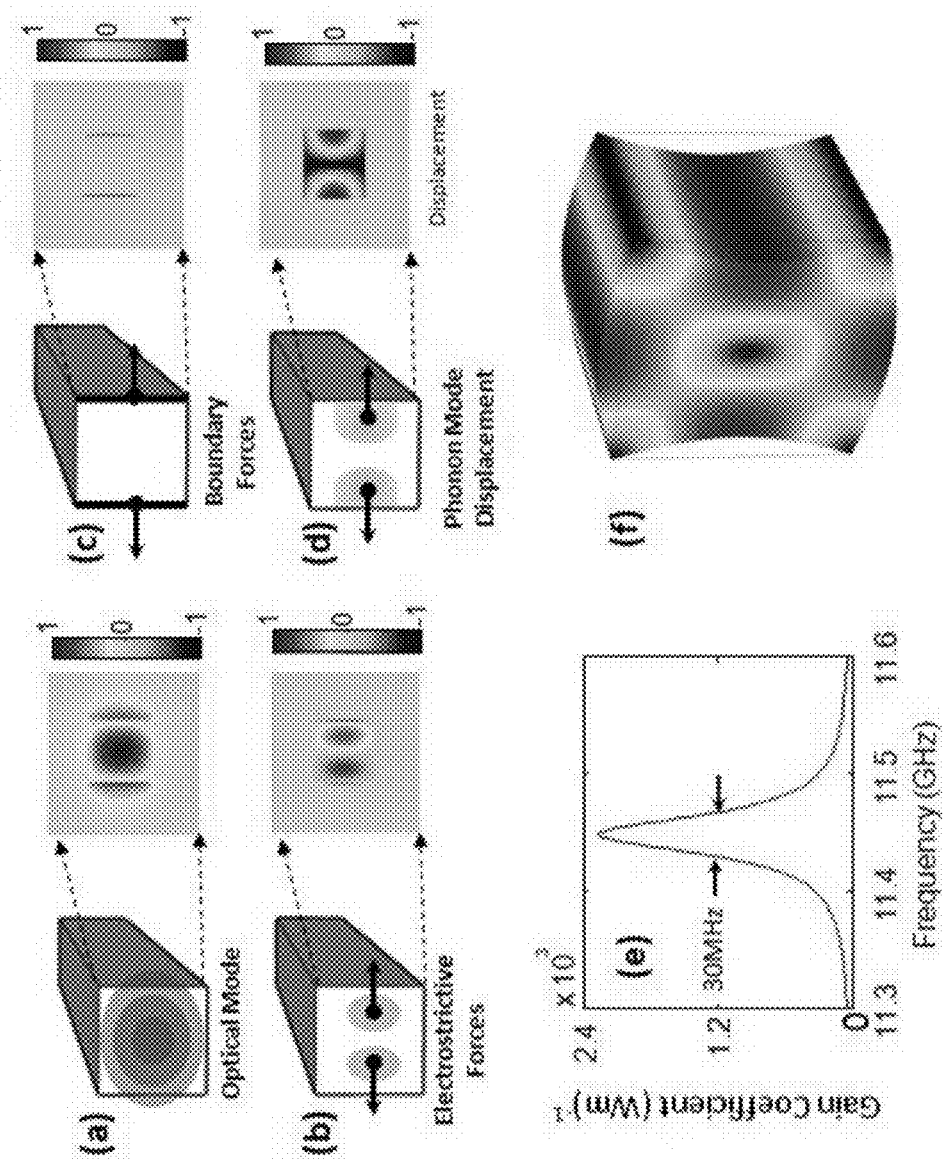
FIG. 15(a) shows the $E_x$ field component of TE-like mode of a suspended rectangular silicon waveguide.
FIGS. 15(b) and (c) show the x-directed force densities produced by electrostriction and radiation pressure, respectively.
FIG. 15(d) shows the displacement field produced by optical forces (at 11.5 GHz).
FIG. 15(e) is a graph of the computed optomechanical parametric gain coefficient versus frequency.
FIG. 15(f) illustrates the excited phononic mode within a suspended rectangular silicon waveguide.

Use of Enhanced Optical Forces to Overcome the "Radiation-Pressure Limit" of Conventional Optomechanics The synergistic use of electrostriction and dispersive modes, which have largely been neglected in nano-optomechanics studies, can far exceed radiation pressure in nano-confined modes, providing a fundamental means of overcoming the "Radiation-Pressure Limit" of conventional optomechanical systems. In contrast to radiation pressure, which originates from the momentum transfer from scattered photons at dielectric boundaries, electrostriction is derived from the strain-dependence of dielectric permittivity. Such forces are present in all dielectric media, as described above. FIG. 15(a) shows the $E_x$ field component of an exemplary TE-like optical mode in a suspended rectangular silicon waveguide. FIGS. 15(*b*) and (*c*) show the x-directed force densities produced by electrostriction and radiation pressure, respectively. FIG. 15(*d*) shows the displacement field produced by optical forces. FIG. 15(*f*) illustrates the excited phononic mode within a suspended rectangular silicon waveguide. In addition to the material degrees of freedom offered by electrostriction, the magnitude and distribution of electrostrictive forces can be further tailored through choice of nano-scale geometry, crystal orientation, and modal profile. Thus, designs based on electrostrictive forces enable selective excitation of phonon modes, not accessible with radiation-pressure alone. By optimal use of electrostriction and radiation pressure with highly dispersive electromagnetic modes, optomechanical transduction efficiencies which surpass performance of conventional systems utilizing radiation pressure alone can be obtained.

The physics of the stimulated phonon emission can be validated through both analytical and numerical multi-physics models. In general, optomechanically stimulated phonon emission is a third-order nonlinear process (illustrated as an energy-level diagram in FIG. 16(*b*)) through which the interference between optical waves of two different frequencies ($\omega_p$, $\omega_s$) produces a time-harmonically modulated optical driving force of frequency, $\Omega=(\omega_p-\omega_s)$. In describing stimulated phonon generation, the optical powers (particle fluxes) $P_p$ ($\phi_P$), $P_s$ ($\phi_s$), corresponding to an optical pump ($\omega_p$) and a Stokes waves ($\omega_s$) are coupled by way of acoustic phonons of frequency $\Omega=(\omega_p-\omega_s)$ and power (particle flux) $P_\Omega$ ($\phi_\Omega$). From the time-varying optical force distributions, the generated elastic wave power can be computed to yield $dP_\Omega/dz$. Applying power and particle conservation, provides $$dP_s/dz=(dP_\Omega/dz)(\omega_s/\Omega)=G_{OM}P_pP_s. \tag{32}$$

Eq. (32) expresses the power growth of the Stokes and phonon waves in terms of an optomechanical gain coefficient, $G_{OM}$. $G_{OM}$ for any uniform waveguide is $$G_{OM} = (2i\omega_s/L)\int_{wg}\left[\sum_{ij}\overline{\sigma}_{ij}\overline{S}_{ij}\right]dV \cong 8\cdot\frac{\omega_s}{\Omega}\cdot\frac{(n_g-n_p)^2}{h\cdot c^2w^2Z(\Omega)}. \tag{33}$$

Here, c is the speed of light, $n_g$ ($n_p$) is the group index (phase index) of the optical waveguide, $Z(\Omega)$ is the frequency dependent effective mechanical impedance of the body into which the phonon is being transduced, and $\overline{\sigma}_{ij}\overline{S}_{ij}$ is the power normalized electromagnetic stress (strain) distribution generated by light in a waveguide segment of width, w, and height, h. Integration (dV) is taken over a waveguide segment of length L. The precise integral form of $G_{OM}$ can be accurately approximated by the simple expressions on the right hand side of Eq. (33). This analytical result agrees remarkably well with 3D finite element simulations, shown in FIG. 15(*e*) which is a graph of the computed optomechanical parametric gain coefficient versus frequency. Within an optimally designed optomechanical silicon waveguide, $G_{OM}$ can take on values between $10^2$-$10^6$ (Wm)$^{-1}$. Here, $G_{OM}$ represents the gain of both the optical Stokes and phonon waves. Based on these models, one finds that phonon amplification is achievable over bandwidths of 1 GHz to 15 GHz with continuous-wave optical excitation through a nano-optomechanical transducer of the type shown in FIG. 16(*a*).

Through generalization of the treatment presented above, a fundamental scaling law that governs the efficiency and bandwidth limitations of radiation pressure driven optomechanical devices can be derived, enabling the comparison of optomechanical systems in a unified framework. As discussed above, a unique maximum of optical force from radiation pressure can be established within an optical medium, regardless of device topology. This limit, which is defined by the maximum sustainable electromagnetic energy density $u_{em}^{max}$ of an optical material, can be termed the "Radiation-Pressure Limit". Based on this fundamental limit, scaling reveals that the maximum quantum efficiency obtained via a radiation pressure mediated process within a unit length ($\Delta z$) of guided wave optomechanical interaction is of the form, $$\eta^{max} = \frac{d\Phi_\Omega}{dz}\frac{\Delta z}{\Phi_p} \cong \alpha\cdot\frac{u_{em}^{max}}{c}\frac{\omega_s}{\Omega}\cdot\frac{(n_g-n_p)^2}{n_g\cdot Z(\Omega)}\Delta z. \tag{34}$$

Here $\phi_p$ ($\phi_\Omega$) is the incident (generated) photon (phonon) flux, $Z(\Omega)$ is the frequency dependent mechanical impedance of the body into which the phonon is being transduced, and a is a factor that depends weakly on geometry. Within nanoscale waveguides and cavities, $u_{em}^{max}$ can be easily obtained at milliwatt laser powers. Thus, for energy densities corresponding to $u_{em}^{max}$, or the "Radiation Pressure Limit," the only means by which transduction efficiency can be increased is through: (1) an increase in modal dispersion ($n_g$-$n_p$), (2) a decrease in mechanical impedance $Z(\Omega)$, or (3) an increase in interaction length, $\Delta z$. The role of dispersion ($n_g$-$n_p$) is derived from its fundamental connection to radiation pressure, as was discussed above.

While Eq. (32) describes a fundamental limit associated with radiation pressure induced parametric processes, this limit can be exceeded through designs which efficiently utilize electrostrictive forces. However, since conventional cavity optomechanical devices are driven only by radiation pressure, their maximum performance is described by Eq. (32). Within such conventional systems, high quantum efficiencies are obtained over very small cavity interaction lengths (i.e., 3-4 optical wavelengths) by use of high quality factor ($Q_{mech}$) mechanical resonance. Resonance drastically reduces the mechanical impedance of the system—albeit over exceedingly narrow bandwidths. For instance, mechanical resonance typically reduces mechanical impedance from $Z=\rho v_a$ to $Z'\sim Z/Q_{mech}$, while increasing $\eta_{max}$ by a factor of $Q_{mech}$. Since resonance always reduces the bandwidth by the exact same factor the efficiency is enhanced, Eq. (34) reveals that mechanical resonance cannot provide fundamental improvement in the bandwidth-efficiency product $\Delta\Omega\cdot\eta$ of transduction. Consequently, resonance offers no reduction in device footprint (at the device or system level) over non-resonant systems for a given information bandwidth, thousands of resonant cavity devices would be necessary to obtain the high bandwidth performance possible with use of a single non-resonant Mach-wave nano-optomechanical transducer of the present invention.

The bandwidth of transduction is intimately related to the device interaction length. Due to the power handling properties of optical materials, one cannot increase the optical force of transduction without limit. Thus, one can show that the bandwidth any optomechanical transducer can only be increased if the interaction length of the system is increased. Accordingly, ($n_g$-$n_p$)·L/Z is the quantity that can be maximized in order to increase transduction bandwidth. The bandwidth can be maximized by increasing the interaction length and force product to provide a minimal mechanical impedance over a large bandwidth. Preferably, the waveguide length is sufficient to achieve an optomechanical gain of $G_{om}$·power >1.

Broadband Optomechanical Delay Line

In contrast, the chip-scale optoelectronic devices of the present invention are based on a novel mesoscale Mach-wave-induced phonon emission process by which a single optomechanical element can support coherent conversion, delay, and filtering of data over bandwidths of 5-20 GHz. These stimulated Mach-wave processes are naturally suited for broadband phonon emission and capture since phonons can rapidly escape, and the pulse shapes are readily preserved. Transducers of the type shown in FIG. 16(a) enable photon-phonon couplings approaching unity quantum efficiency, with relative transduction bandwidths of 120% (e.g., 5-20 GHz), covering much of the C, X and K communication bands. Such transduction bandwidths are 100-1,000 times greater than available by any chip-scale electromechanical or optomechanical transduction technology to date. Through marriage of this technology for ultrabroadband photon-phonon coupling with silicon photonics, phononics, and CMOS fabrication platforms, high fidelity signal processing with revolutionary size, weight and power consumption metrics can be achieved. Such technologies can enable electronically steerable antennae (ESA), radar-based transponders, broadband acousto-optic (AO) signal processing for LADAR, and a host of filtering and channelizing applications. See R. Williamson and R. Esman, *Journal of Lightwave Technology* 26 (9), 1145 (2008).

Figure 16:
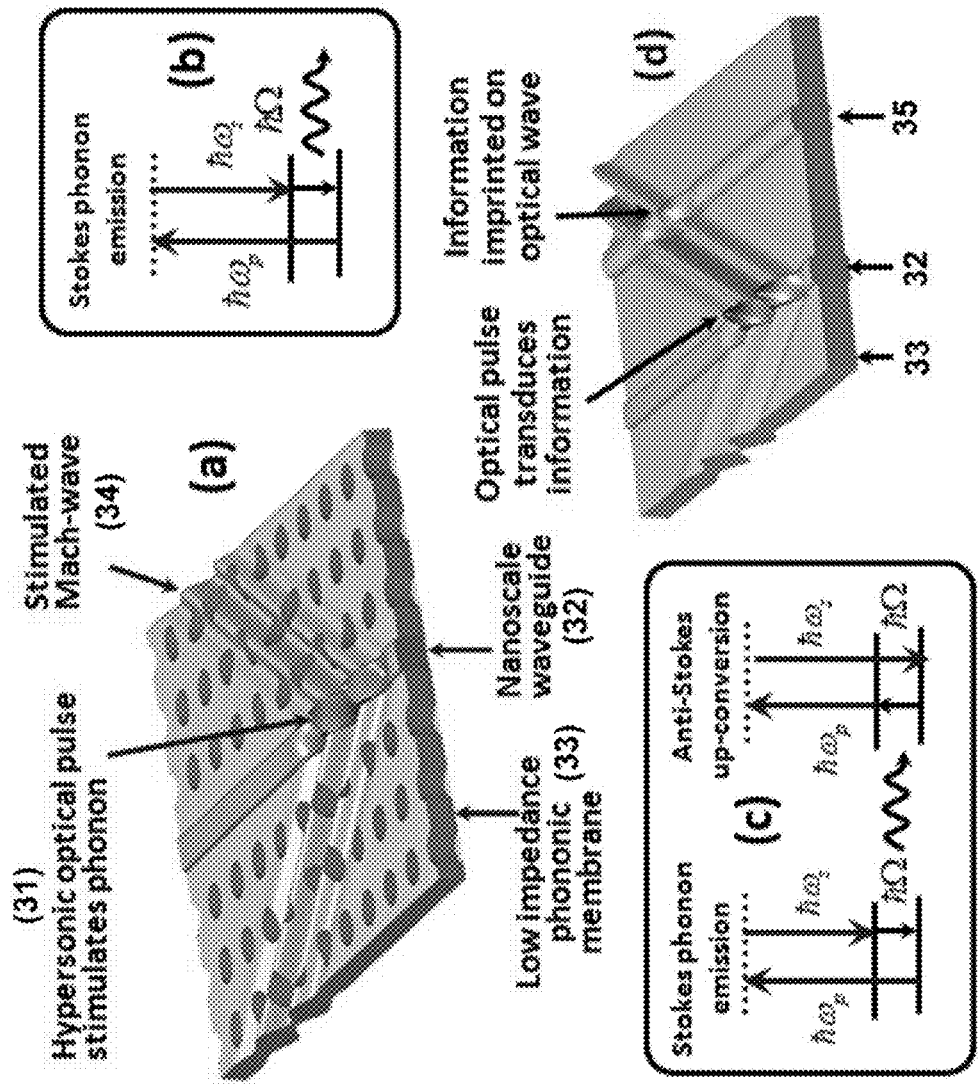
FIG. 16(a) is a schematic illustration of stimulated shock-wave emission (or Stokes emission) by an optical pulse as it propagates through a phononic membrane.
FIGS. 16(b)-(c) are energy-level diagrams for coherent Stokes phonon emission and anti-Stokes up-conversion.
FIG. 16(d) is a schematic illustration of the transmittal of information between opposing optomechanical waveguides via Mach-wave phonons.

Ultra-broadband stimulated Mach-wave phonon emission within the nano-scale hybrid photonic-phononic waveguide geometries of the present invention can provide for broadband phononic signal amplification and transduction, as shown in FIGS. 16(a-d). FIG. 16(a) is a schematic illustration of stimulated shockwave emission (or Stokes emission) by an optical pulse as it propagates through a low-impedance-phononic membrane. An optical pulse train 31 propagating in a nanoscale waveguide 32 creates an acoustic Mach-wave pulse 34 that propagates in a phononically engineered low impedance membrane 33. Mach-waves (the non-dissipative version of shock-waves) are typically produced by a hypersonic disturbance, resulting in a characteristic conical wave front with angle, θ, determined by the ratio of the characteristic velocities (in this case, sound and light). Stimulated Mach-wave phonons of the type shown in FIG. 16(a) can be produced by strong optomechanical coupling during propagation of the optical pulse in the waveguide, arising from transducer designs exploiting electrostriction and radiation pressure induced within the waveguide. Further enhancement of stimulated phonon emission can be achieved by use of artificial phononic media with reduced phononic impedance. At remarkably low optical power (mW), the traveling wave pulse produces an enormous supersonic optomechanical disturbance due to the enhanced optical forces and reduced impedance within the nanoscale waveguide. The result is coherent phonon generation, amplification and modulation over bandwidths in excess of 15 GHz (e.g., from 5-20 GHz) with high quantum efficiency. The coherent phonon packets emitted by the optical pulse carry the information content of the optical-wave packet. As the hypersonic optical pulse propagates, it continuously emits phonons to form the stimulated Mach-wave, and it simultaneously experiences a redshift in its optical pulse spectrum. This phonon emission process is quantum mechanically consistent with coherent Stokes emission of phonons. FIG. 16(b) shows the energy-level diagram for coherent Stokes phonon emission at the transducing optical waveguide. Coherent recovery of the information transferred to the phonon wave packet is possible through an analogous traveling wave process in an opposing receiving optical waveguide 35, as shown in FIG. 16(d) making this mechanism well suited for broadband information transduction. FIG. 16(c) is the energy-level diagram for the anti-Stokes up-conversion at the receiving optical waveguide. This time delay geometry is well suited for broadband information transduction. This enables broadband chip-scale phononic signal processing via Mach-wave transduction.

Figure 17A:
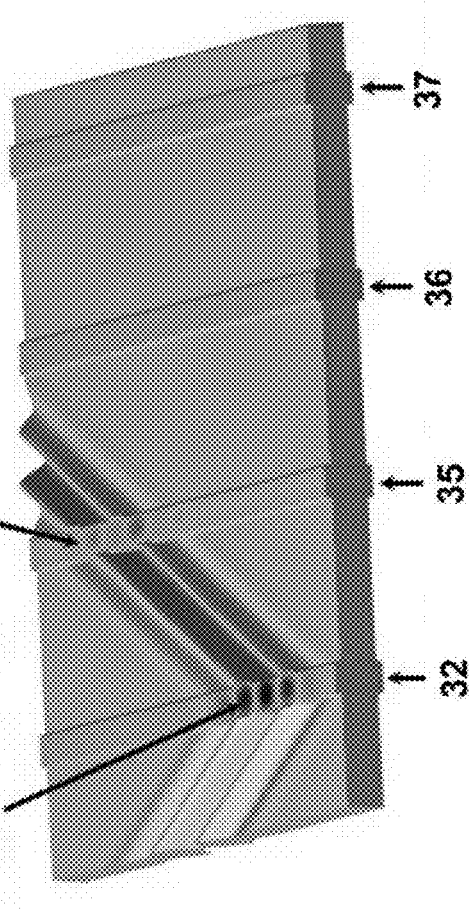
FIG. 17(a) is a schematic illustration of a signal delay device. A signal is transduced by a pulse in transducing optical waveguide and received by 1 of 3 optical receiving waveguides.
Figure 17B:
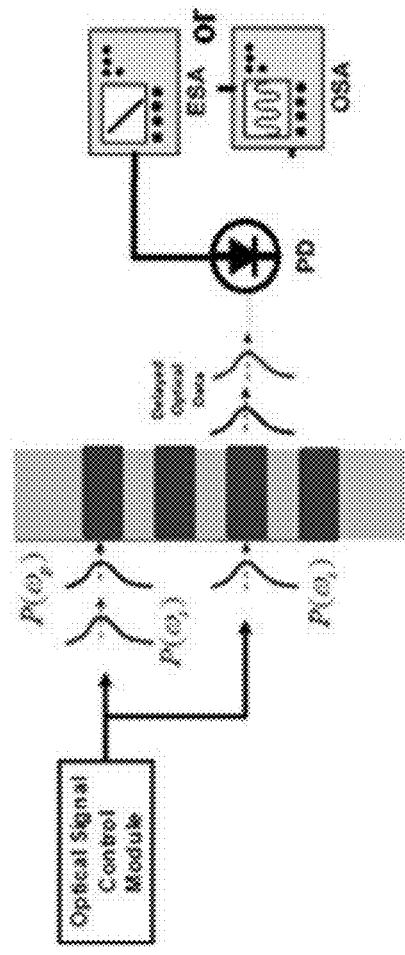
FIG. 17(b) is a schematic illustration of a signal delay system with an array of receiving waveguides.

FIG. 17(a) is a schematic illustration of an exemplary signal delay device that provides multiple time delays. A signal is transduced by an optical pulse in a transducing optical waveguide 32. In this example, the delayed data is imprinted on the optical waves propagating in multiple receiving waveguides 35, 36, and 37, each waveguide providing a different propagation length (delay). FIG. 17(b) is a schematic illustration of a signal delay system with an array of receiving waveguides. An optical signal control module injects an encoded input optical signal $P(\omega_p)$ in the transducing optical waveguide that generates an acoustic wave comprising the encoded information. The acoustic signal propagates in a phononic membrane and reaches a receiving optical waveguide after a time delay. The acoustic signal is converted back into the optical domain at the receiving waveguide, encoding the acoustic data onto a continuous optical signal $P(\omega_s)$ traveling in the receiving waveguide to produce a delay optical output signal comprising the encoded data. The delayed optical data can be detected by a photodiode (PD) and decoded by a spectrum analyzer.

The present invention has been described as a nano-optomechanical transducer using direct optical-to-phononic signal conversion. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nano-optomechanical transducer, comprising:
   a suspended membrane;
   a transducing optical waveguide, mechanically coupled to the suspended membrane;
   an input optical signal that is coupled into the transducing optical waveguide, wherein the input optical signal generates an acoustic wave that propagates in the suspended membrane; and
   at least one receiving optical waveguide, mechanically coupled to the suspended membrane and separated from the transducing optical waveguide by an acoustic delay length, wherein the input optical signal is an optically encoded signal and wherein the acoustic wave modulates a continuous wave optical signal propagating in the receiving optical waveguide.

2. The transducer of claim 1, wherein the transducing optical waveguide is fabricated on a side of the suspended membrane.

3. The transducer of claim 1, wherein the transducing optical waveguide is embedded in the suspended membrane.

4. The transducer of claim 1, wherein the transducing optical waveguide comprises a rectangular waveguide.

5. The transducer of claim 1, wherein the transducing optical waveguide comprises an evanescently-coupled compound, or dual, waveguide, a circular waveguide, or a waveguide having a step-index cross-section that possesses a guided eigenmode.

6. The transducer of claim 1, wherein the cross-sectional dimension of the transducing optical waveguides is less than the wavelength of the input optical signal.

7. The transducer of claim 1, wherein the transducing optical waveguide has a length sufficient to provide an optomechanical gain of greater than unity.

8. The transducer of claim 1, wherein the transducing optical waveguide comprises silicon.

9. The transducer of claim 1, wherein the transducing optical waveguide comprises silicon nitride, germanium, chalcogenide glass, silica, $As_2S_3$ glass, gallium arsenide, or a III-V semiconductor compound.

10. The transducer of claim 1, wherein the suspended membrane comprises a semiconductor, glass, or polymer.

11. The transducer of claim 1, wherein the suspended membrane comprises silicon dioxide.

12. The transducer of claim 1, wherein the suspended membrane comprises silicon nitride, silicon carbide, alumina, or aluminum oxide.

13. The transducer of claim 1, wherein the suspended membrane is fabricated from a silicon-on-insulator wafer.

14. The transducer of claim 1, wherein the suspended membrane comprises a low mechanical impedance (low-Z) effective medium.

15. The transducer of claim 14, wherein the low mechanical impedance (low-Z) effective medium comprises a phononic crystal.

16. The transducer of claim 15, wherein the phononic crystal comprises a two-dimensional periodic array of air holes.

17. The transducer of claim 15, wherein the phononic crystal comprises a two-dimensional periodic array of scatterer material that has a density and/or elastic constant that is different than the membrane material.

18. The transducer of claim 1, wherein the at least one receiving optical waveguide is substantially parallel to the transducing optical waveguide.

19. The transducer of claim 1, wherein the acoustic delay length is greater than 100 ns.

20. The transducer of claim 1, wherein the input optical signal is optically encoded by phase or amplitude modulation.

21. The transducer of claim 20, wherein the phase or amplitude modulation is encoded by a lithium niobate modulator, an electrooptic modulator, an electroabsorption modulator, or an acoustooptic modulator.

22. The transducer of claim 1, further comprising an acoustic signal processing transducer between the transducing and receiving optical waveguides.

23. The transducer of claim 22, wherein the acoustic signal processing device comprises a cavity, phononic crystal, or grating.

* * * * *